United States Patent
Ohtani et al.

(10) Patent No.: US 9,582,679 B2
(45) Date of Patent: Feb. 28, 2017

(54) TERMINAL DEVICE, DATA MANAGEMENT SERVER, TERMINAL PROGRAM, DATA MANAGEMENT PROGRAM, AND DATA MANAGEMENT SYSTEM

(71) Applicant: FUJITSU LIMITED, Kawasaki-shi, Kanagawa (JP)

(72) Inventors: Takeshi Ohtani, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 14/672,340

(22) Filed: Mar. 30, 2015

(65) Prior Publication Data
US 2015/0286834 A1 Oct. 8, 2015

(30) Foreign Application Priority Data
Apr. 8, 2014 (JP) .................................. 2014-079289

(51) Int. Cl.
*G06F 7/04* (2006.01)
*G06F 21/62* (2013.01)
*G06F 21/30* (2013.01)
*H04L 29/08* (2006.01)

(52) U.S. Cl.
CPC .......... *G06F 21/6218* (2013.01); *G06F 21/30* (2013.01); *G06F 21/6209* (2013.01); *H04L 67/02* (2013.01)

(58) Field of Classification Search
CPC .. G06F 21/6218; G06F 21/6209; G06F 21/30; H04L 67/02
See application file for complete search history.

(56) References Cited

U.S. PATENT DOCUMENTS

| 5,889,952 A | 3/1999 | Hunnicutt et al. |
| 6,678,731 B1 | 1/2004 | Howard et al. |
| 2003/0028622 A1 | 2/2003 | Inoue et al. |
| 2004/0148410 A1* | 7/2004 | Howard .................. G06F 21/31 709/229 |
| 2005/0028006 A1 | 2/2005 | Leser et al. |

(Continued)

FOREIGN PATENT DOCUMENTS

| JP | 2007-094548 | 4/2007 |
| JP | 2008-515084 | 5/2008 |
| JP | 2013-509737 | 3/2013 |

OTHER PUBLICATIONS

EESR—Extended European Search Report of European Patent Application No. 15160820.5 dated Jun. 8, 2015.

*Primary Examiner* — Mohammed Waliullah
(74) *Attorney, Agent, or Firm* — Fujitsu Patent Center

(57) ABSTRACT

A terminal device that includes a processor configured to execute a procedure. The procedure includes: receiving an electronic text data request; attaching to the electronic text data request a token associated with a ticket, and attaching to the electronic text data request a changed status ticket out of the ticket; and holding sending of a new electronic text data request when the new electronic text data request is received during an interval between sending the electronic text data request to the data management server and receiving a token, and relaying any held electronic text data requests in sequence to the data management server, when it is after the interval and there are no changed status tickets of the terminal present.

15 Claims, 35 Drawing Sheets

(56) References Cited

U.S. PATENT DOCUMENTS

2006/0070131 A1 3/2006 Braddy et al.
2012/0264443 A1 10/2012 Ng et al.
2014/0230020 A1* 8/2014 Mogaki .................. H04L 63/10
　　　　　　　　　　　　　　　　　　　　726/4

* cited by examiner

FIG.3

[CIRCUMSTANCE DATA PRIOR TO ENCRYPTION + Base64 ENCODING]

Id#1, com.foo.bar.place, MeetingRoom 1, 1392199978659, http:// foo.bar.com:8989/

TICKET ID  TICKET TYPE  TICKET NAME  VALIDITY PERIOD  TICKET ISSUER DATA

ENCRYPTION + Base64 ENCODING

[CIRCUMSTANCE DATA AFTER ENCRYPTION + Base64 ENCODING]

Ytyl 5b7xZnyBJaiLEOwG 920EGfxvjatiF 1YIMtf 3j5HwK6S/ 1B9rOR 5YjhAaDZf 4zh81zzpZjx k1wNX53pTWFxrWFnNyFXEEwX 67RWK5+UE2VXeRurjep 8aAvUvhmExp 0+ao6IXUds 35d QePz4jSSsqDJY +0hyKcqeGzYEXZ 0oY=

(172 BYTES)

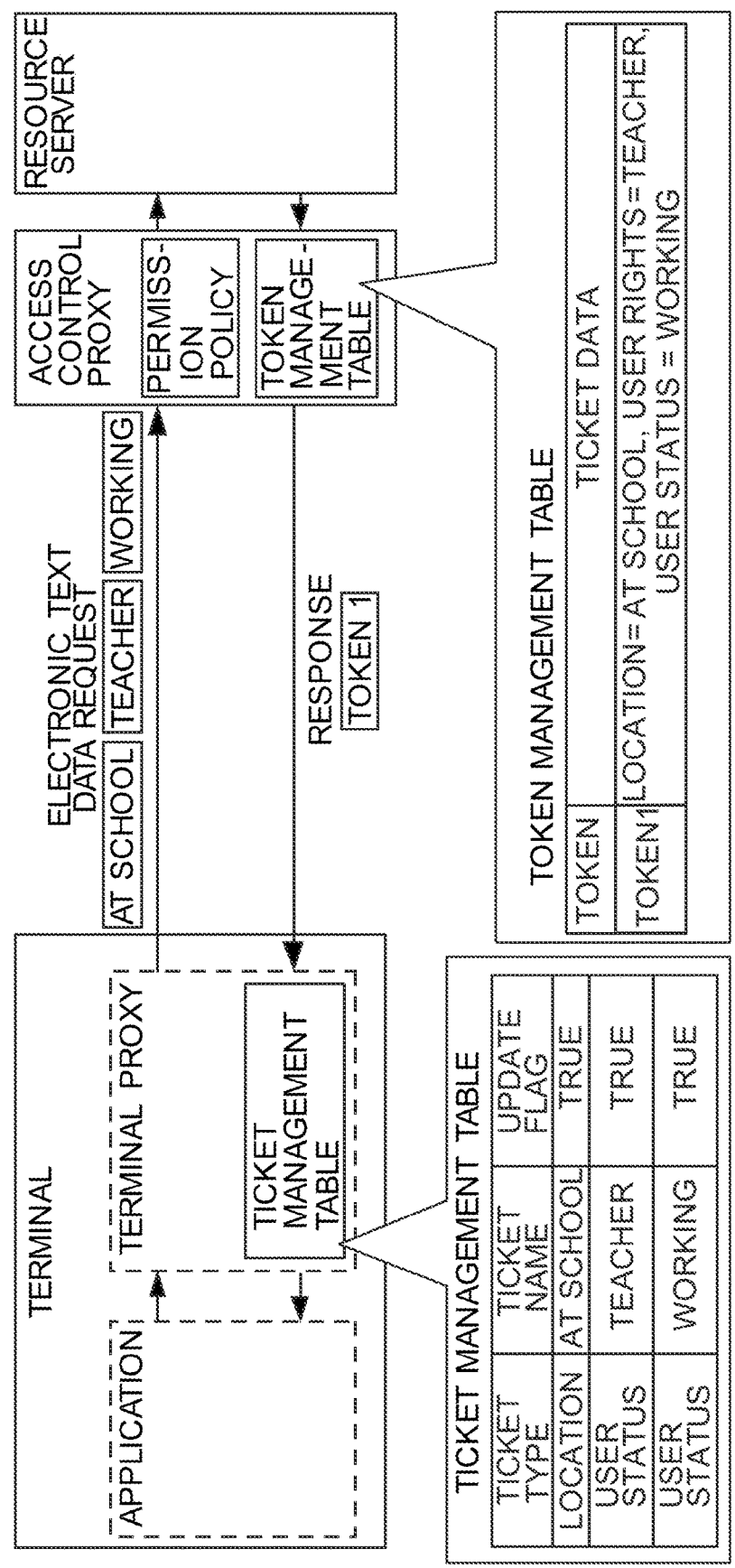

FIG.8

```
GET / baz HTTP / 1.1
Host : foo.bar.com:8080
User-Agent :xxxxx
Connection : keep-alive
X-Token :20140214181020300 - 01
X-Ticket - Num: 3
X-Ticket - 0: AAAAAAA ··· AAAAAAAAAAAA
X-Ticket - 1: BBBBBBB ··· BBBBBBBBBBBB
X-Ticket - 2: CCCCCCC ··· CCCCCCCCCCCC
```

FIG.10

| TOKEN | TICKET DATA |
|---|---|
| 20140214181020300-01 | LOCATION = AT SCHOOL, USER RIGHTS = TEACHER, USER STATUS = WORKING |
| 20140216181222302-02 | LOCATION = AT SCHOOL, USER RIGHTS = TEACHER, USER STATUS = NOT WORKING |

FIG.11

| RESOURCE URL | TICKET DATA |
|---|---|
| http://foo.bar.com:8080/baz1 | LOCATION = AT SCHOOL, USER RIGHTS = TEACHER, USER STATUS = WORKING |
| http://foo.bar.com:8080/baz2 | LOCATION = AT SCHOOL, USER RIGHTS = TEACHER, USER STATUS = NOT WORKING |

FIG. 12

| TOKEN | RESOURCE URL | DETERMINATION RESULT |
|---|---|---|
| 20140214181020300-01 | http://foo.bar.com:8080/baz1 | PERMITTED |
| 20140216181222302-02 | http://foo.bar.com:8080/baz2 | DENIED |

FIG.13

```
HTTP / 1.1 200 OK
Content - Type : text / html
Content - Length : 100
Date : Thu, 13 Feb 2014 10 :10:07 GMT
X- New- Token : 20140216181222302 - 02

<html>
   ~
</ html >
```

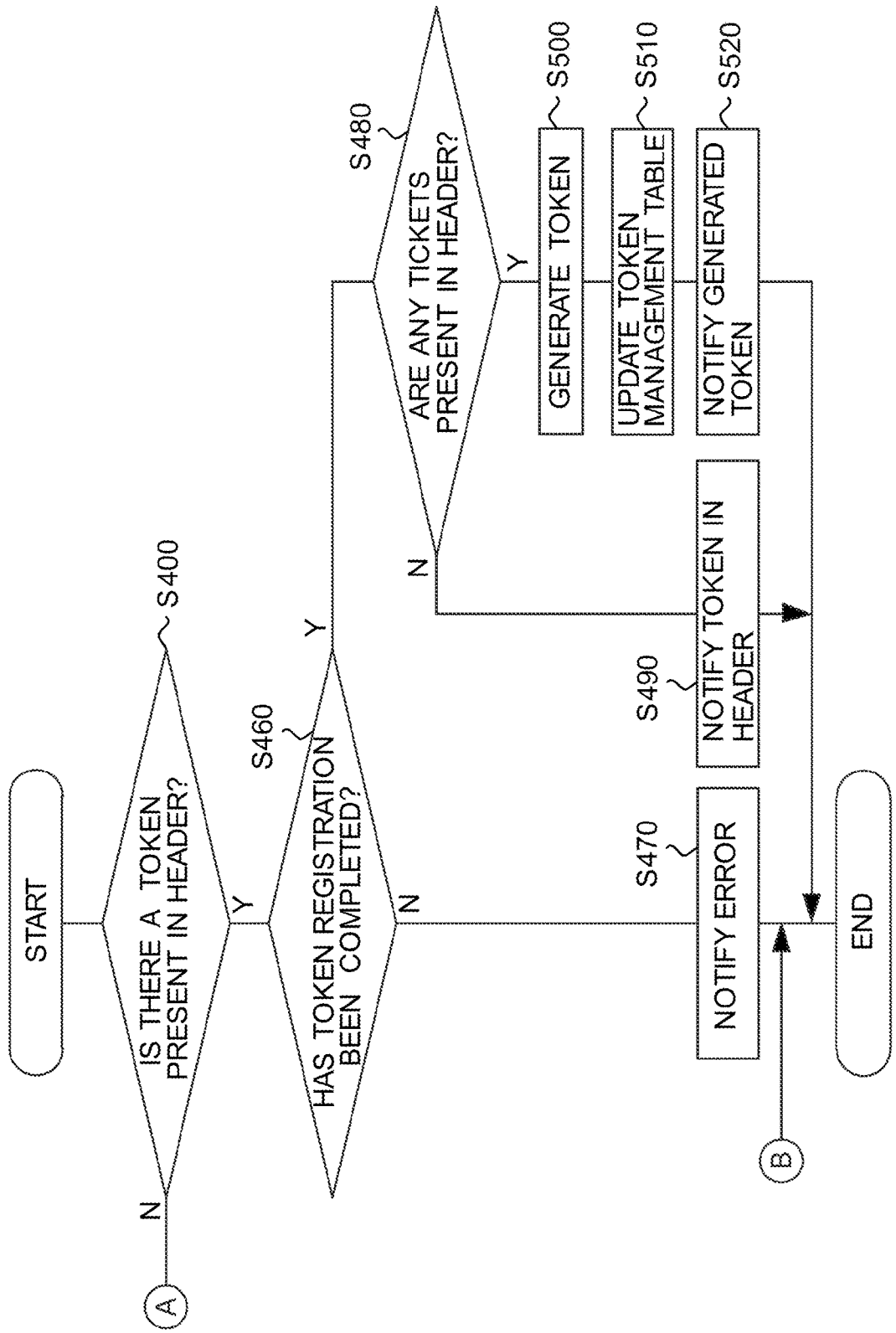

FIG.22

| SESSION ID | UPDATE TIME | UPDATED TICKET DATA ||||
| | | LOCATION | USER RIGHTS | USER STATUS |
|---|---|---|---|---|
| S#1 | 2014/2/14 18:10:20.300 | AT SCHOOL | TEACHER | WORKING |
| S#1 | 2014/2/14 18:10:30.000 | AT HOME | - | - |
| S#1 | 2014/2/14 18:10:20.100 | - | - | NOT WORKING |

FIG.23

| TOKEN | SESSION ID | TICKET DATA |
|---|---|---|
| 20140214181020300-01 | S#1 | LOCATION = AT SCHOOL, USER RIGHTS = TEACHER, USER STATUS = WORKING |
| 20140214181030000-02 | S#1 | LOCATION = AT HOME, USER RIGHTS = TEACHER, USER STATUS = WORKING |
| 20140214181030100-03 | S#1 | LOCATION = AT HOME, USER RIGHTS = TEACHER, USER STATUS = NOT WORKING |

FIG.29

| APPLICATION NAME | SENDING FREQUENCY [TIMES/HOUR] |
|---|---|
| APPLICATION #1 | 52 |
| APPLICATION #2 | 3 |
| APPLICATION #3 | 18 |

FIG.31

| APPLICATION ID | RESOURCE URL | TICKET DATA |
|---|---|---|
| app#1 | http:// foo.bar.com:8080/baz1 | LOCATION = AT SCHOOL, USER<br>RIGHTS = TEACHER, USER<br>STATUS = WORKING |
| app#2 | http:// foo.bar.com:8080/baz2 | LOCATION = AT SCHOOL, USER<br>RIGHTS = TEACHER, USER<br>STATUS = NOT WORKING |

FIG.32

| TOKEN | APPLICATION ID | RESOURCE URL | DETERMINATION RESULT |
|---|---|---|---|
| 20140214181020300-01 | app#1 | http://foo.bar.com:8080/baz1 | PERMITTED |
| 20140216181222302-02 | app#2 | http://foo.bar.com:8080/baz2 | DENIED |

TERMINAL DEVICE, DATA MANAGEMENT SERVER, TERMINAL PROGRAM, DATA MANAGEMENT PROGRAM, AND DATA MANAGEMENT SYSTEM

CROSS-REFERENCE TO RELATED APPLICATION

This application is based upon and claims the benefit of priority of the prior Japanese Patent Application No. 2014-079289, filed on Apr. 8, 2014, the entire contents of which are incorporated herein by reference.

FIELD

The embodiments discussed herein are related to a terminal device, a data management server, a data management program, and a data management system.

BACKGROUND

Recently, there are increasing opportunities to use portable terminals, known as mobile terminals, to access a server installed at a company or the like and download resources such as data from the server to the mobile terminal to carry out business.

In such mobile environments, access control processing is performed in the server to restrict access from terminals as the need arises.

As an example of access control processing, methods are proposed in which data relating to the terminal is collected and sent to the server, and the server determines whether or not to permit access to a resource based on the data sent from the terminal. The data relating to the terminal may, for example, employ data of the position of the terminal.

Methods are also proposed to restrict terminal's access to a service provided by an application server by employing a verification token issued by a verification server when the terminal requests verification for a terminal user from the verification server.

RELATED PATENT DOCUMENTS

Japanese National-Phase Publication No. 2008-515084
Japanese Patent Application Laid-Open (JP-A) No. 2007-94548
Japanese National Phase Publication No. 2013-509737

SUMMARY

According to an aspect of the embodiments, a terminal device includes: a processor configured to execute a process, the process including: receiving an electronic text data request requesting data managed by a data management server; attaching, to the received electronic text data request, a token generated by the data management server, the token associated with at least one ticket used as an access right to the data and corresponding to a circumstance of the terminal, or a circumstance of a user using the terminal, or both; from among the at least one ticket, further attaching, to the electronic text data request, a changed status ticket with a changed status corresponding to a change in the circumstance; and holding transmission of a new electronic text data request when the new electronic text data request is received during an interval between sending the electronic text data request, with the changed status ticket attached thereto, to the data management server and receiving an updated token based on the changed status ticket from the data management server, and relaying any held electronic text data requests to the data management server in sequence, after the interval when there are no changed status tickets of the terminal present.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a ticket.

FIG. 4 is a diagram illustrating an example of access control employing a token.

FIG. 8 is a diagram illustrating an example of a header of an electronic text data request.

FIG. 10 is a diagram illustrating an example of a token management table.

FIG. 11 is a diagram illustrating an example of a permission policy table.

FIG. 12 is a diagram illustrating an example of a determination results table.

FIG. 13 is a diagram illustrating an example of a response.

FIG. 18A is a flowchart illustrating token update processing in a data management server according to the first exemplary embodiment.

FIG. 22 is a diagram illustrating an example of a ticket update management table according to the second exemplary embodiment.

FIG. 23 is a diagram illustrating an example of a token management table according to the second exemplary embodiment.

FIG. 29 is a diagram illustrating an example of a sending frequency table.

FIG. 31 is a diagram illustrating an example of a permission policy table according to the third exemplary embodiment.

FIG. 32 is a diagram illustrating an example of a determination results table according to the third exemplary embodiment.

DESCRIPTION OF EMBODIMENTS

Detailed explanation follows regarding exemplary embodiments of technology disclosed herein, with reference to the drawings.

First Exemplary Embodiment

Along with developments in communication network facilities, environments are being developed for portable mobile terminals to share data with a remote server and execute operations at various locations. However, such situations mean that a state exists in which an operator is able to access a server using a mobile terminal or the like from a location not monitored by an operations supervisor such as a superior. The importance of server security management is accordingly coming under increasing scrutiny.

Figure 1:
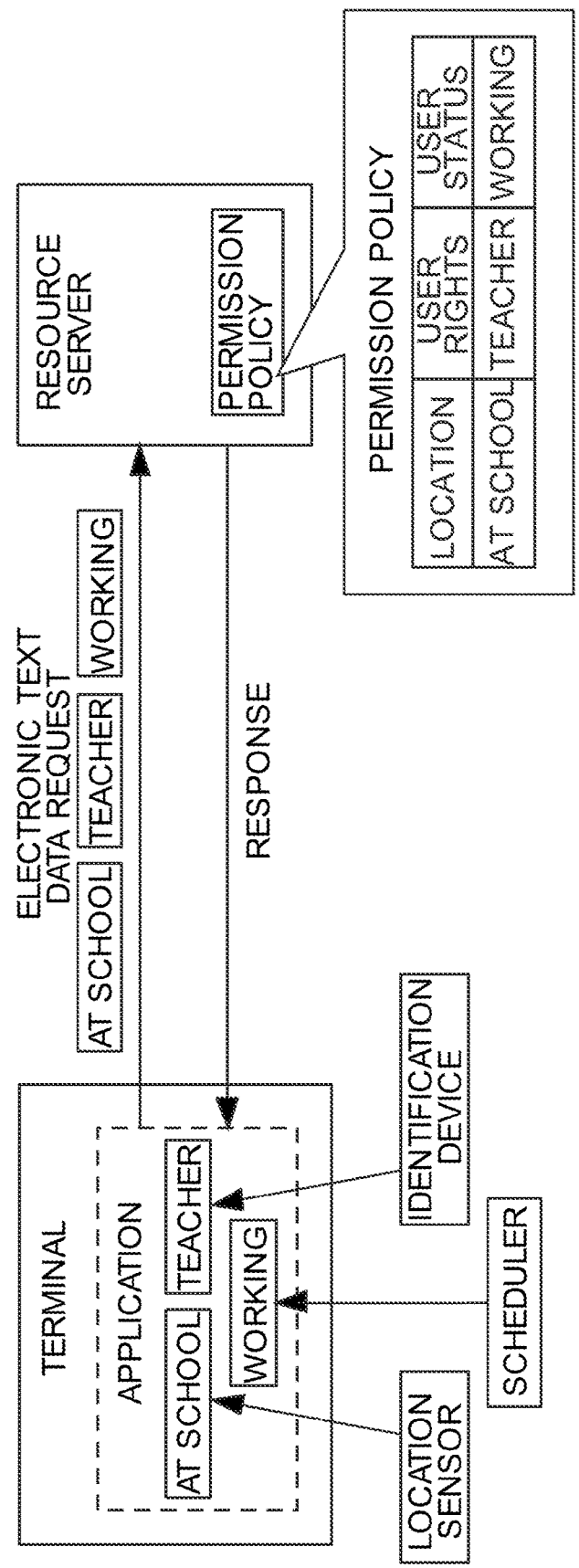
FIG. 1 is a diagram illustrating an example of access control when accessing a resource server from a terminal.

FIG. 1 is a diagram illustrating an example of access control when various data (resources) stored on a resource server are accessed from a mobile terminal (referred to as a terminal below) at a remote location.

As illustrated in FIG. 1, an application executed by a terminal, for example when accessing a resource, acquires circumstance data including data indicating the circumstances of the terminal user. The terminal application attaches predetermined circumstance data required for resource acquisition to an electronic text data request listing the acquisition-desired resource, and transmits these to the resource server. In the resource server, determination is made, with reference to a permission policy, as to whether or not access to the resource is permissible with the circumstance data received from the terminal. If access is permitted, the resource server then sends a response attached with the requested resource to the terminal that sent the electronic text data request.

The circumstances of the terminal user are, for example, a location of the terminal user expressed for example by terminal position data, user rights of the terminal user corresponding for example to the organization to which the terminal user belongs and the terminal user's rank in the affiliated organization, and user status such as whether the terminal user is on a break or working. For clarity of explanation, an example follows of a case in which the terminal user is a teacher; however the terminal user is not limited to being a teacher, and obviously may be someone in any position. The circumstances of the terminal user needing to access the resource are also not limited to the location of the terminal user, the user rights, or the user status, and may also include other data. The circumstance data may also include, instead of the circumstances of the terminal user, for example circumstances of the terminal, or circumstances of the terminal and circumstances of the terminal user's surroundings. However, for clarity of explanation, an example follows in which the terminal user circumstances are three types of circumstance data, namely: location, user rights, and user status.

For example, the teacher reads data stored on a personal ID card into a data reader device, such as a card reader, connected wirelessly, for example, to the terminal, thereby notifying an application installed on the terminal that their own user rights are those of a "teacher". The data reader device then, for example, wirelessly notifies time data of when the ID card data was read and a teacher ID that is an identifier to identify the teacher to a scheduling device pre-stored with the timetable of the teacher. The scheduling device references the timetable of the teacher, and, based on the notified time data and teacher ID, for example wirelessly notifies the terminal-installed application that the user circumstances of the teacher is "working" when determined that it is currently a working time of the teacher indicated by the teacher ID. Moreover, for example, the terminal application acquires the position of the teacher from position data output for example from a Global Positioning System (GPS) sensor installed in the terminal, and determine that the location of the teacher is "at school" when the acquired position data is within a school position data range.

For each resource, the application then attaches the predetermined circumstance data required when the teacher acquires the desired resource to an electronic text data request, and transmits this to the resource server.

For example, if the permission policy for the resource requested by the terminal is (location, user rights, user status)=(at school, teacher, working), then the resource server grants access permission to the resource when the circumstance data attached to the electronic text data request satisfies the permission policy. In the example illustrated in FIG. 1, the circumstance data attached to the electronic text data request satisfies the permission policy, so the resource server attaches the resource requested by the teacher to a response to the electronic text data request, and transmits this to the terminal application that sent the electronic text data request.

In the above example, consider a situation in which the teacher attempts to acquire the same resource as the resource they accessed at school using a terminal that the teacher has taken home. In such a situation, the terminal application determines that position data acquired from the GPS sensor is within the range of pre-registered position data indicating the teacher's house, and determines the location of the teacher to be "at home". Thus, since the circumstance data attached to the electronic text data request differs from the resource permission policy, the teacher is unable to acquire from the teacher's home the same resource as the resource accessed at school.

However, there is an issue concerning such control methods for access rights to resources in that there is no guarantee as to the trustworthiness of the circumstance data since the circumstance data handled by the terminal is attached to the electronic text data request by the terminal application itself. For example, there might be occasions when a resource is acquired even though the actual circumstances of the terminal user are a status outside the permission policy if the circumstance data attached to the electronic text data request is falsified circumstance data indicating circumstances different to the actual circumstances of the terminal user.

Moreover, due to the need to update pre-existing applications to add processing to attach circumstance data to the electronic text data request, it is conceivable that it would be difficult to apply such a control method for access rights to resources to pre-existing applications. Even for applications within the resource server, there is still a need for an update, such as to add additional functionality to extract the circumstance data from the electronic text data request and to determine whether or not the permission policy has been satisfied. Thus it is conceivable that it would be difficult to apply such a control method for access rights to resources to resource servers.

A method is accordingly proposed in which a circumstance data attaching proxy is provided between a terminal-installed application and a communication network, and an access control proxy is provided between the communication network and the resource server.

Figure 2:
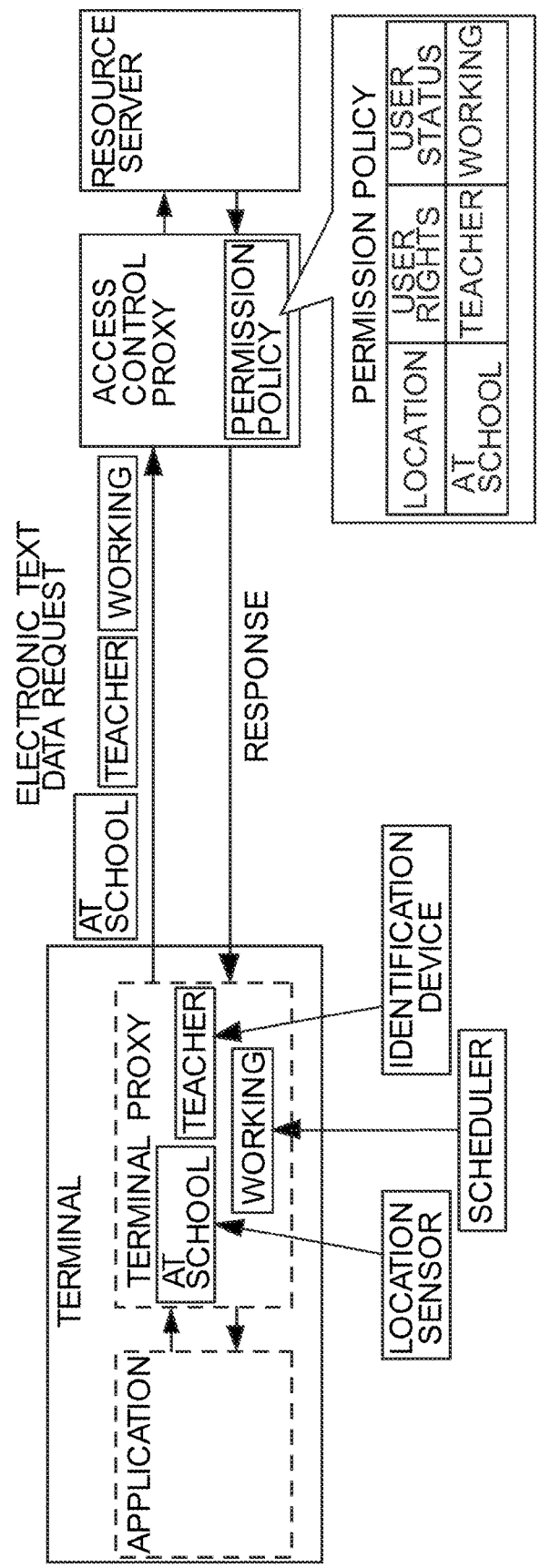
FIG. 2 is a diagram illustrating an example of access control when accessing a resource server when provided with proxies.

FIG. 2 is a diagram illustrating a control method for access rights to resources when a circumstance data attaching proxy and an access control proxy are provided.

The circumstance data attaching proxy is a proxy that collects circumstance data and attaches the circumstance data to electronic text data request received from an application, relays this to the access control proxy, and relays a response received from the access control proxy to the terminal-installed application. Explanation follows regarding an example in which the circumstance data attaching proxy is provided within the terminal; however a circumstance data attaching proxy may be disposed externally to the terminal.

The access control proxy is a proxy that compares the circumstance data attached to the electronic text data request received from the terminal against permission conditions of a pre-registered permission policy, and relays the electronic text data request to the resource server when the permission conditions are satisfied. The access control proxy then relays the response corresponding to the relayed electronic text data request from the resource server to the circumstance data attaching proxy in the terminal that sent the electronic text data request.

In such cases, due to control processing for access rights to resources being executed in the circumstance data attaching proxy and the access control proxy, there is no need to update the terminal-installed application or the resource server. It is also possible to detect malicious manipulation of either of the proxies as long as the circumstance data attaching proxy and the access control proxy are managed by the resource manager. This thereby improves the trustworthiness of the circumstance data attached to electronic text data request compared to the resource access control method illustrated in FIG. 1. Moreover, so that the circumstance data itself is not tampered with, the device notifying the circumstance data, the circumstance data attaching proxy, and the access control proxy also employ mutually trusted circumstance data, for example encrypted circumstance data. The trustworthiness of the circumstance data attached to the electronic text data request is accordingly further improved.

In the following, trusted circumstance data is referred to as a "ticket", and unless stated otherwise, reference simply to "circumstance data" indicates a ticket. The circumstance data attaching proxy is also referred to as a "terminal proxy", and the access control proxy is referred to as a "control proxy".

In such an access rights control method using proxies, in order to raise the independence of the terminal proxy from the control proxy and improve security performance, the terminal proxy does not hold data regarding the permission policy required for acquiring the resource. Namely, the terminal proxy attaches all collected tickets to the electronic text data request. In such cases, since the data volume of the electronic text data request is larger than the data volume of the electronic text data request in the resource access control method illustrated in FIG. 1, the load (communication load) relating to communication processing in the terminal is increased, and sometimes there is an increase in the power consumption of the terminal.

Specific details regarding the data volume of the electronic text data request will now be discussed. FIG. 3 is a diagram illustrating an example of a ticket attached to an electronic text data request.

As illustrated in FIG. 3, circumstance data prior to encryption includes ticket identification (ID), ticket type, ticket name, validity period, and ticket issuer data. The ticket ID is an item for identifying the ticket. The ticket type is an item indicating whether the ticket is data relating to location, data relating to user rights, or data relating to user status. The ticket name is an item indicating the specific content relating to the type indicated by the ticket type, and is set, for example, as "at school" or "at home" for a the ticket type of "location". The validity period indicates the validity period of the ticket, and, for example, is expressed by the milliseconds elapsed since 0:00 am on Jan. 1, 1970. The ticket is treated by the control proxy as an invalid ticket after the validity period has elapsed, and resource access is denied due to being an invalid ticket. The ticket issuer data is data to identify the device or the like that issued the ticket to the terminal proxy, and, for example, is expressed as a uniform resource location (URL) indicating the whereabouts of the device on a network.

The circumstance data prior to encryption is, for example, encrypted by the ticket issuer with an encryption key of a predetermined number of bits. Then when, for example, an electronic text data request from an application is expressed as a hypertext transfer protocol (HTTP) request, the terminal proxy encodes the ticket in Base64. The terminal proxy then attaches the Base64 encoded ticket to the header of the electronic text data request. The terminal proxy and control proxy are pre-loaded with a public key for the encryption key of the ticket issuer.

The data volume of each ticket attached to the electronic text data request header is, for example, 172 bytes. If, say, the terminal proxy collects three types of ticket relating to location, user rights, and user status, then 516 bytes worth of tickets are attached to the electronic text data request header each time. If, say, the data volume of the electronic text data request received from the application is itself to be confined to about 500 bytes, then the data volume of the electronic text data request relayed from the terminal proxy to the control proxy may have a data volume that is about twice that of the initial electronic text data request.

Obviously the data volume of the electronic text data request to be relayed from the terminal proxy to the control proxy increases with an increase in at least one of the number of tickets or the data volume per ticket. As the number of bits of the encryption key used for encrypting the ticket is increased in order to improve the ticket trustworthiness, the data volume of the electronic text data request to be relayed from the terminal proxy to the control proxy also increases. Namely, the data volume of the electronic text data request increases accompanying improvements to security performance for resource access requests, thereby further increasing the communication load on the terminal proxy.

However, the electronic text data request received by the control proxy is attached with all of the tickets collected by the terminal proxy every time. The control proxy therefore needs to decode all the tickets attached to the electronic text data request each time an electronic text data request is received from the terminal proxy. The control proxy then determines whether or not to permit resource access based on the content of the ticket names of the ticket types required to access the resource requested by the terminal, and the permission policy. The load on the control proxy is accordingly increased in comparison to the resource access control method illustrated in FIG. 1, and the response performance from when the electronic text data request was sent to when a response returns is lowered, as viewed from the terminal-installed application. Namely, sometimes there is a decrease in the user friendliness of the application.

As an example of a method to suppress such an increase in the load on the terminal proxy and the control proxy, a conceivable method is to attach a token to the electronic text data request, instead of the tickets.

Such a token is data associated with the content of the ticket names of all of the ticket types collected by the terminal proxy, and is data valid for a period in which there is no change to the content of the ticket names of all of the ticket types. A token needs only to uniquely indicate the content of the ticket names of all of the ticket types collected by the terminal proxy. The token may accordingly be expressed by a hash value derived from the content of the ticket names of all of the ticket types, the token generation time, or the like. As a specific example of the present exemplary embodiment, the token generation time is associated with the content of the ticket names of all of the ticket types, and employed as a token.

A token in the present exemplary embodiment is, for example, expressed as a 20 byte character string such as "20140214181020300-01". In this example 2014 expresses the year, 02 the month, 14 the day, 18 the hour, 10 the minutes, 20 the seconds, and 300 the milliseconds. The two digit character string after the hyphen indicates a serial number, such as 01, 02, and so on. This is a serial number indicating the time series of tokens generated within a shorter interval than a millisecond, with larger numbers expressed by the two digit character string indicating tokens that were generated later. For example, "-02" indicates a token generated after that of "-01".

Figure 5:
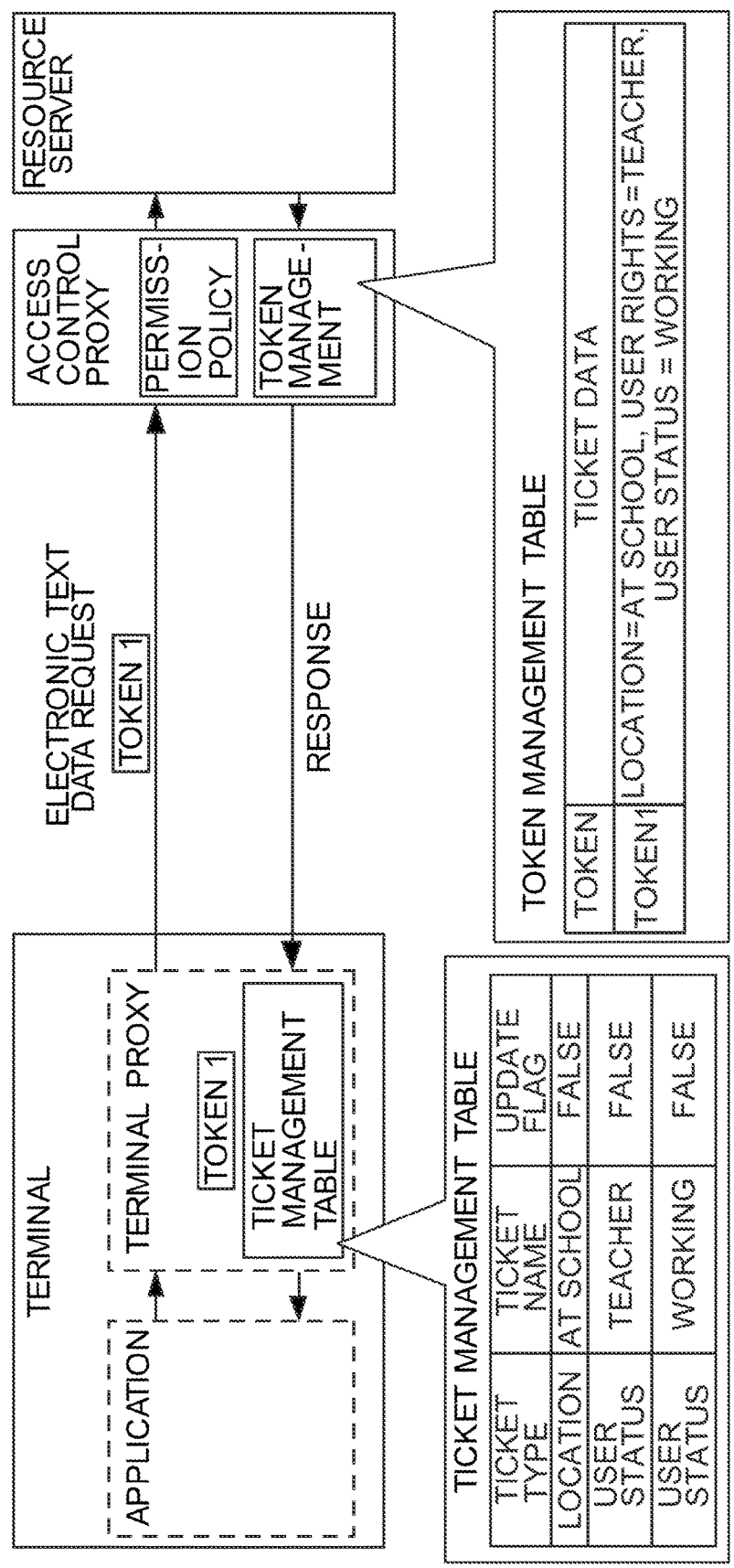
FIG. 5 is a diagram illustrating an example of access control when there is no change in ticket status.
Figure 6:
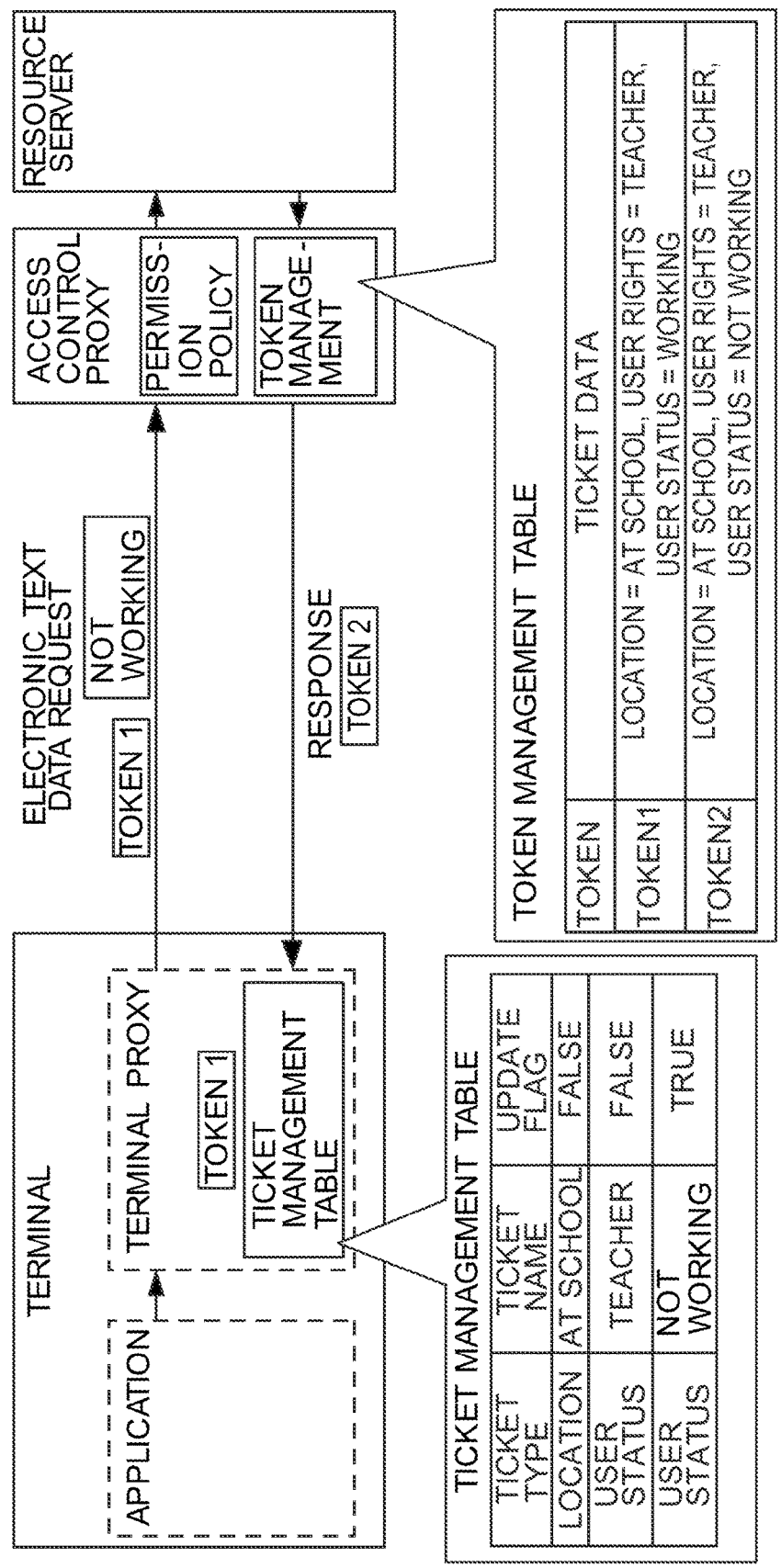
FIG. 6 is a diagram illustrating an example of access control when a ticket status has changed.

FIG. 4 to FIG. 6 are diagrams to explain an example of a resource access control method utilizing tokens.

FIG. 4 illustrates an example of a resource access control method when a terminal sends an electronic text data request to a control proxy for the first time.

The terminal proxy contains a ticket management table that manages all of the collected tickets, and manages the ticket type, the ticket name, and an update flag, for each of the tickets. The update flag refers to a binary variable that is set by the terminal proxy to "true" when the content of the ticket name has changed, and set to "false" by the terminal proxy when processing (described in detail below) has been performed by the terminal proxy with respect to the change in the content of the ticket name. A change in the content of the ticket name means that circumstance data has been notified with a different ticket name for the same ticket type, and refers to the status of the ticket having changed.

The terminal proxy executes processing to attach tickets with update flags set to "true", namely tickets with changed status (changed status tickets), to the electronic text data request, and to send the electronic text data request to the control proxy. Note that the update flag for each of the tickets is set to "true" when the terminal proxy sends the electronic text data request to the control proxy for the first time. Thus the terminal proxy attaches all of the tickets collected by the terminal proxy to the electronic text data request when the terminal proxy sends an electronic text data request to the control proxy for the first time.

The control proxy in turn generates a token based on the ticket attached to the electronic text data request. When doing so, the control proxy generates a token management table in which generated token content, or more specifically the token generation time, is associated with data (ticket data) indicating the set of tickets attached to the electronic text data request. Then, based on the permission policy, the control proxy then determines whether or not access is permitted to the requested resource with the tickets corresponding to the generated token, and forwards the electronic text data request to the resource server if access is permitted.

On receipt of a response from the resource server, the control proxy attaches the generated token (token 1 in the example illustrated in FIG. 4) to the response, and forwards the response to the terminal proxy of the terminal that sent the electronic text data request.

The terminal proxy acquires and retains the token attached to the received response. The terminal proxy then returns the update flag of the tickets attached to the electronic text data request to "false" since the ticket change has been acknowledged by the control proxy. The response, from which the token has been deleted, is then forwarded to the application.

FIG. 5 is a diagram illustrating an example of a resource access control method in a case in which there are no changed tickets.

In such a case, on receipt of an electronic text data request from the application, instead of the tickets, the terminal proxy attaches the retained token 1 to the electronic text data request, which is then forwarded to the control proxy. In the control proxy, the token management table is referenced, and the ticket data for the terminal corresponding to the received token (token 1 in the example illustrated in FIG. 5) is acquired. The control proxy then determines whether or not access is permitted to the requested resource, based on the ticket data acquired from the token management table, and the permission policy. Namely, the control proxy is able to ascertain the status of the ticket in the terminal from the token attached to the electronic text data request.

FIG. 6 illustrates an example of a resource access control method when a ticket status has changed.

In such a case, on receipt of an electronic text data request from the application, the terminal proxy attaches the retained token and a changed status ticket to the electronic text data request, which is then forwarded to the control proxy. In the example illustrated in FIG. 6, in the tickets collected by the terminal proxy, the ticket name of the ticket of the ticket type of user status has changed from "working" to "not working" Here, the terminal proxy also sets the update flag of the ticket (user status=not working) to "true". The terminal proxy accordingly attaches the token 1 and the ticket indicating user status to the electronic text data request. When doing so the terminal proxy sets the update flag of the ticket (user status=not working) to "false".

The control proxy then references the token management table, acquires the ticket data associated with the token 1, and, from out of the acquired ticket data, substitutes the ticket attached to the electronic text data request for the ticket of the same ticket type as the acquired ticket attached to the electronic text data request. The control proxy then generates a new token based on the ticket data after substitution, and adds data associating the newly generated token and the ticket data after substitution to the token management table.

In the example illustrated in FIG. 6, from out of the ticket data associated with the token 1, the ticket (user status=working) is substituted with (user status=not working) The control proxy then generates a token 2 corresponding to the three tickets (location=at school), (user rights=teacher), and (user status=not working).

Then, in a case in which the permission policy of the requested resource is (location, user rights, user status)=(at school, teacher, working), the control proxy attaches the newly generated token 2 to a response indicating an error due to denial of access to the resource, and forwards these to the terminal proxy.

The terminal proxy then retains the token 2 that has been newly issued from the control proxy in place of the token 1.

In the resource access control method illustrated in FIG. 2, all of the tickets need to be attached to the electronic text data request, irrespective of whether or not the tickets have changed. However, in the resource access control method illustrated in FIG. 4 to FIG. 6, it is sufficient to attach a token, having a smaller data volume than the tickets, to the electronic text data request for tickets whose status has not changed. This thereby enables a reduction in the communication load on the terminal.

However, when the terminal application is a web application, such as a browser, sometimes plural resources are needed in order to display a single screen. Namely, plural electronic text data requests are sent from the application to the terminal proxy every time the screen being displayed by the web application changes. Suppose that the status of a ticket changes at this timing, then there is sometimes an increase in communication load for the terminal due to the terminal proxy needing to attach the ticket with changed status to each of the electronic text data requests and forward them to the control proxy.

In order to reduce the communication load generated when plural electronic text data requests are received when a ticket status has changed, a method is conceivable, for example, in which the terminal proxy waits for the responses to each of the electronic text data requests, and relays the electronic text data requests to the control proxy one at a time. However, with such a method it would take time to complete the display of a single screen, resulting in a deterioration in the user friendliness of the web application.

Explanation therefore follows regarding reducing the communication load on the terminal, and also regarding a terminal and resource management server that suppress deterioration of the user friendliness of an application.

Figure 7:
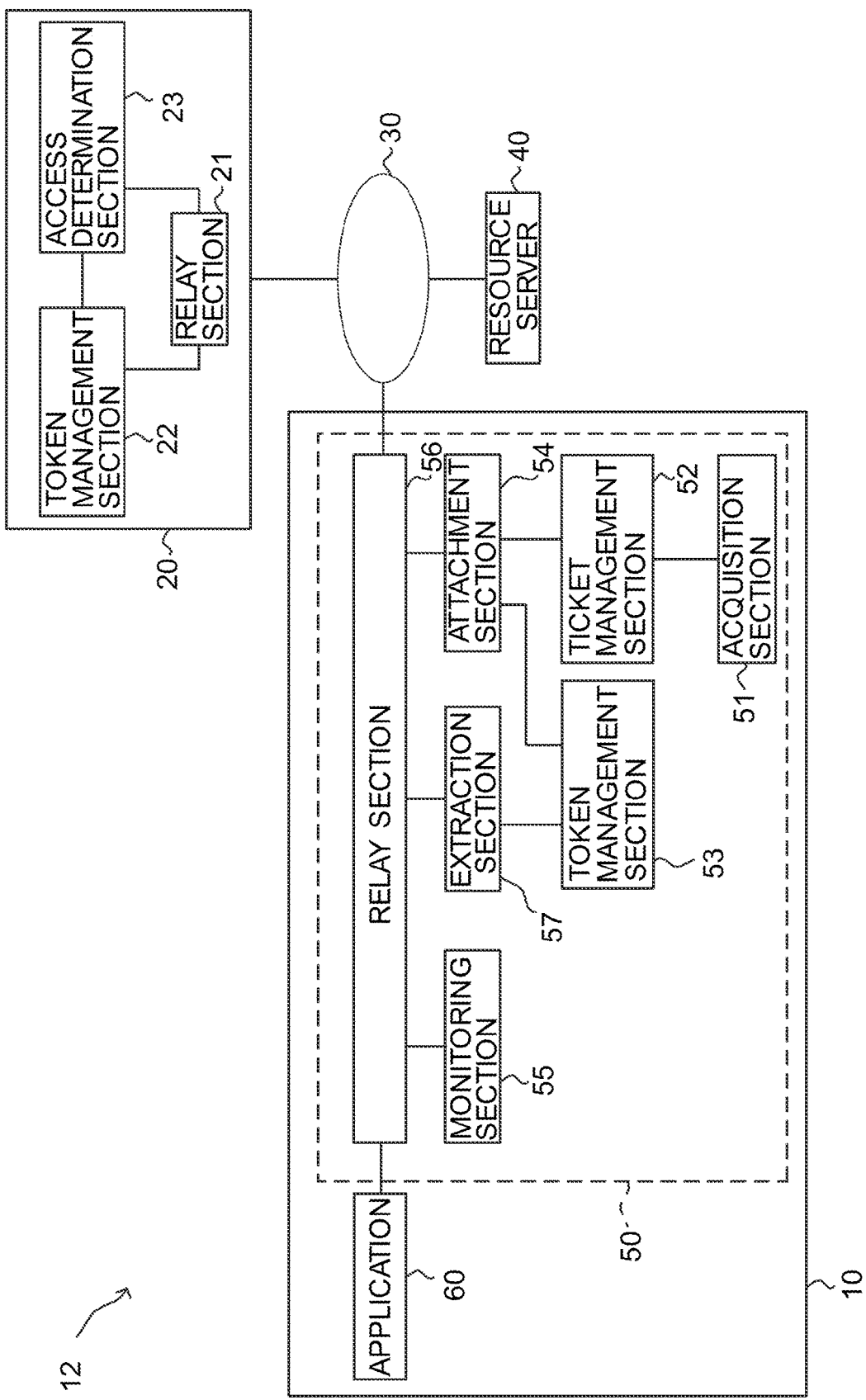
FIG. 7 is a diagram illustrating an example of a system including a terminal and a data management server according to a first exemplary embodiment.

FIG. 7 is a diagram illustrating a system 12 including a terminal 10 and a data management server 20 according to the present exemplary embodiment. The terminal 10 and the data management server 20 are connected together and exchange data with each other through a communication line 30. A resource server 40 stored with resources is also connected to the communication line 30, and resource requested by the terminal 10 is sent to the terminal 10 by the data management server 20. The resource server 40 does not necessarily need to be connected to the communication line 30, and configuration may be made such that functions of the resource server 40 are contained in the data management server 20. The resource server 40 and the data management server 20 may also be connected together directly by a separate communication line to the communication line 30.

Plural terminals 10 may be connected to the communication line 30, however in order to simplify explanation, in the present exemplary embodiment a case will be described in which a single terminal 10 is connected to the communication line 30.

Moreover, although explanation is given of a case in which http format electronic text is employed for the various electronic texts used by the terminal 10, the data management server 20, and the resource server 40 of the present exemplary embodiment, obviously electronic texts according to other protocols may be employed.

A terminal proxy 50 includes an acquisition section 51, a ticket management section 52, a token management section 53, an attachment section 54, a monitoring section 55, a relay section 56, and an extraction section 57. The terminal 10 includes the terminal proxy 50 and an application 60.

The acquisition section 51 acquires tickets for collection in the terminal 10 using a wired method, or a wireless method, or both. Modes for acquiring the tickets encompass a mode in which the tickets are acquired from a ticket issuer device, and a mode in which data of a sensor contained in the terminal 10, not illustrated in the drawings, is sent to an external device requesting the data to be made into a ticket, and the ticketed data of the sensor is then acquired. The acquisition section 51 issues the ticket management section 52 with the acquired ticket.

The ticket management section 52 references the content of the tickets acquired by the acquisition section 51, and updates the content of the ticket management table for each of the ticket types. When doing so, the ticket management section 52 then sets the update flag to "true" if the ticket name of an acquired ticket is different from the ticket name the previous time. The ticket management section 52 then overwrites the tickets acquired by the acquisition section 51 for each of the ticket types, and retains the tickets.

Note that the ticket management section 52 sets the update flag column of the ticket type corresponding to the acquired ticket to "true" when a ticket of ticket type not previously retained is first acquired.

Then, on receipt of a request from the attachment section 54 for changed status tickets, as described below, the ticket management section 52 references the ticket management table, and provides any tickets whose update flag is "true", namely changed status tickets, to the attachment section 54. The ticket management section 52 then sets the update flag of the changed status tickets provided to the attachment section 54 to "false". If there are no changed status tickets present, then the ticket management section 52 notifies the attachment section 54 with data representing that there are no changed status tickets present, without providing any tickets.

The token management section 53 retains tokens sent from the data management server 20, and provides the retained token in response to a request from the attachment section 54, as described below. If there is no retained token present when a token is requested by the attachment section 54, the token management section 53 notifies the attachment section 54 with data indicating that there is no token.

The attachment section 54 attaches the token and any changed status tickets to the header of an electronic text data request received from the application 60 according to instruction from the relay section 56, as described below. More specifically, the attachment section 54 requests changed status tickets from the ticket management section 52, and attaches any changed status tickets acquired from the ticket management section 52 to the header of the electronic text data request. The attachment section 54 requests a token from the token management section 53, and attaches the token acquired from the token management section 53 to the header of the electronic text data request.

The attachment section 54 does not attach any tickets to the header of the electronic text data request when notified by the ticket management section 52 with data indicating that there are no changed status tickets. Similarly, the attachment section 54 does not attach a token to the header of the electronic text data request when notified by the token management section 53 with data indicating that there is no token.

FIG. 8 is a diagram illustrating an example of the header of an electronic text data request with a token and changed status tickets attached. The data encompassed by the intermittent line in FIG. 8 is an example of a token and changed status tickets attached by the attachment section 54.

The text string "20140214181020300-01" following "X-Token:" represents a token. The number following "X-Ticket-Num:" is the number of tickets attached to the header. Each of the text strings following on from "X-Ticket-0:", "X-Ticket-1:", and "X-Ticket-2:" represent tickets. As already explained, the tickets are, for example, encrypted with an encryption key of a predetermined number of bits, for example 128 bits, and are text strings encoded by Base64.

Thus when notified by the token management section 53 with data indicating that there is no token, the item "X-Token:" is not added to the header. Moreover, when notified from the ticket management section 52 with data indicating that there are no changed status tickets, the item "X-Ticket-Num:" and the item "X-Ticket-N: (wherein N is an integer of 0 or above) are not added to the header.

On receipt of an electronic text data request from the application 60, the relay section 56 instructs the attachment section 54 to attach to the header of the electronic text data request at least one out of any changed status tickets or the token employed as access rights to the resource requested by the electronic text data request. The relay section 56 then relays the electronic text data request, with at least one of any changed status tickets or the token attached by the attachment section 54, to the data management server 20.

The relay section 56 relays a response received from the data management server 20 to the monitoring section 55, the extraction section 57, described below, and the application 60 that sent the electronic text data request corresponding to the response.

The monitoring section 55 monitors whether or not at least one changed status ticket is attached to the header of the electronic text data request relayed to the data management server 20 by the relay section 56. The monitoring section 55 then sets a token updating flag to "true" when there is at least one changed status ticket attached to the header of the electronic text data request.

The monitoring section 55 also monitors whether or not there is an updated token attached to the header of the response relayed by the relay section 56 to the application 60. The monitoring section 55 sets the token updating flag to "false" when a token is attached to the header of the response. In response to interrogation from the relay section 56, the monitoring section 55 notifies the set value of the token updating flag when interrogated.

When an updated token has been attached to the header of the response being relayed by the relay section 56 to the application 60, the extraction section 57 extracts the updated token. The extraction section 57 then provides the extracted token to the token management section 53. The token management section 53 retains the provided token in place of the previously retained token.

Moreover, on receipt of an electronic text data request from the application 60, the relay section 56 also interrogates the monitoring section 55 for the status of the token updating flag prior to instructing the attachment section 54 to attach the at least one of any changed status tickets and the token. When the token updating flag is "true", namely when a response, to an electronic text data request entailing a token update sent to the data management server 20, has not yet been returned to the relay section 56, the relay section 56 holds relay of the received electronic text data request to the data management server 20. More specifically, the electronic text data request is held in a queue contained in the relay section 56, such as in a first in, first out (FIFO) queue.

However, when the token updating flag is "false", the relay section 56 does not hold the received electronic text data request in a queue, and instead relays the received electronic text data request to the data management server 20 according to the processing explained above.

On receipt of a response from the data management server 20, the relay section 56 interrogates the monitoring section 55 for the status of the token updating flag. When the token updating flag is "false", the relay section 56 removes the electronic text data request from the queue it is being held in, and relays the electronic text data request removed from the queue to the data management server 20 according to the processing explained above. The relay section 56 interrogates the monitoring section 55 for the status of the token updating flag each time one of the electronic text data requests is removed from the queue. This is performed since it is conceivable that changes in ticket status may have occurred while the electronic text data request was being held. If the token updating flag is "true", then the relay section 56 holds the electronic text data request in the queue until a response attached with a new token is returned.

Figure 9:
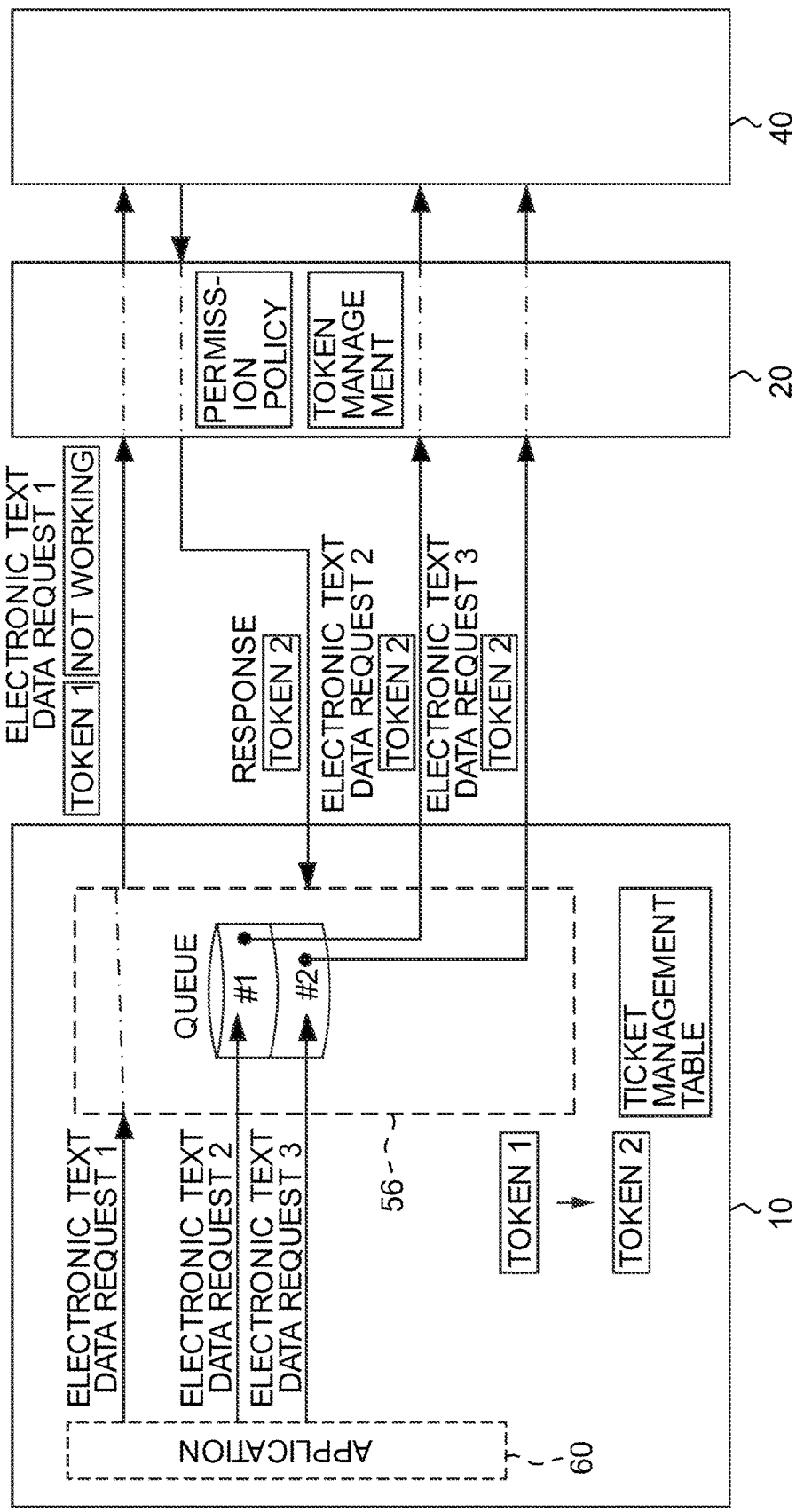
FIG. 9 is a diagram illustrating an example of holding processing of an electronic text data request.

FIG. 9 is a diagram illustrating an example of electronic text data request holding processing executed by the relay section 56.

The example in FIG. 9 is one in which the ticket name of the user status ticket type is changed from "working" to "not working" when the relay section 56 receives an electronic text data request 1 from the application 60. It is also an example in which the token 1 is retained by the token management section 53 when the relay section 56 receives the electronic text data request 1 from the application 60.

In such a case, the relay section 56 relays the electronic text data request 1 attached with the token 1 and the changed status ticket of (user status=not working) to the data management server 20. When this is performed the token updating flag is set to "true" by the monitoring section 55.

Say that, prior to a response attached with a token 2 that is the updated token corresponding to the electronic text data request 1 sent from the data management server 20 to the relay section 56, the relay section 56 receives an electronic text data request 2 and an electronic text data request 3 from the application 60. In such cases, since the token updating flag is "true", the relay section 56 holds the received electronic text data request 2 and electronic text data request 3 respectively in queue #1 and queue #2.

Then, when the relay section 56 has received a response, the token retained in the token management section 53 is exchanged for the token 2, and the token updating flag is set to "false" by the monitoring section 55. The relay section 56 accordingly removes the electronic text data request 2 from the queue #1, and sends the token 2 attached by the attachment section 54, together with the electronic text data request 2, to the data management server 20.

Moreover, the relay section 56 interrogates the monitoring section 55 for the status of the token updating flag if there is still an electronic text data request being held in queue. If the token updating flag is "false", then the relay section 56 removes the electronic text data request 3 from the queue #2 without waiting for a response to the electronic text data request 2, and sends the electronic text data request 3 to the data management server 20, together with the token 2 attached by the attachment section 54.

In the example of FIG. 9, no changed status tickets have arisen when the electronic text data requests 2, 3 are sent. In FIG. 7, in order to simplify explanation, only the one application 60 is illustrated, however plural applications 60 may obviously be contained in the terminal 10.

Explanation next follows regarding the data management server 20.

The data management server 20 includes a relay section 21, a token management section 22, and an access determination section 23.

The relay section 21 receives the electronic text data request sent from the terminal 10, and notifies the header to the token management section 22 and orders updating of the token.

Based on the token management table explained above and the header, the token management section 22 checks the validity of the received token, updates the token management table, and generates a token.

FIG. 10 is a diagram illustrating an example of a token management table managed by the token management section 22.

As explained above, the token management table is a table in which the generated tokens, and the status of each of the tickets in the terminal 10, are associated with each other. The token management section 22 is able to acquire the status of each of the tickets in the terminal 10 from the token by referencing the token management table. In the example of FIG. 10, if for example the token represented by "20140214181020300-01" is received, the token management section 22 acquires ticket data indicating the location of the terminal 10 to be at school, the person using the terminal 10 to be a teacher, and the teacher to be working.

The token management section 22 manages the token according to token update rules, as explained below.

When there is no token or ticket present in the header of the electronic text data request, the token management section 22 determines the header to be an irregular header, and generates error data. The token management section 22 then notifies the generated error data to the relay section 21.

When there is no token present in the header of the electronic text data request, but there are tickets present, the token management section 22 generates a token corresponding to the tickets in the header. The token management section 22 notifies the generated token to the relay section 21, and manages the token management table in which the generated token, and the tickets corresponding to the token, are associated with each other. This case corresponds to a situation in which the terminal 10 has sent an electronic text data request to the data management server 20 for the first time.

When the token specified in the header of the electronic text data request is not present in the token management table, the token management section 22 determines the specified token to be an irregular token, and generates error data. The token management section 22 then notifies the generated error data to the relay section 21.

When there are no tickets present in the header of the electronic text data request, but there is a token present, and when that token is present in the token management table, the token management section 22 determines that the specified token is a valid token. In such cases, the token management section 22 notifies the received token to the relay section 21 as it is, without generating a new token. Such a case corresponds to a situation in which the terminal 10 has sent an electronic text data request in a state in which there are no changed status tickets present.

When a ticket and a token are present in the header of the electronic text data request, and the token is present in the token management table, the token management section 22 generates a new token. The new token is a token corresponding to a token in which the ticket data of the terminal 10 expressed by the token in the header has been exchanged for the ticket in the header.

As an example, explanation follows regarding a case in which the token in the header is "20140214181020300-01", and a ticket in the header is (user status=not working) The token management section 22 first references the token management table illustrated in FIG. 10, and ascertains that the ticket data represented by the token is (location, user rights, user status)=(at school, teacher, working) The token management section 22 then updates the ascertained ticket data using the ticket in the header. In such cases, since the ticket in the header is (user status=not working), the new ticket data is (location, user rights, user status)=(at school, teacher, not working) The token management section 22 then generates a token (for example "20140216181222302-02") corresponding to the new ticket data, and updates the token management table with the generated token and the new ticket data associated with each other.

When the token management section 22 has generated a token, a flag (token generation flag) indicating that a token has been generated is set to "true".

Moreover, on receipt of the token from the token management section 22, the relay section 21 relays the received token and the electronic text data request to the access determination section 23.

The access determination section 23 holds a permission policy table in which the permission policy is defined for each of the resources managed by the data management server 20, and only permits access to the resources for electronic text data requests that satisfy the permission policy.

FIG. 11 is a diagram illustrating an example of a permission policy table contained in the access determination section 23.

As illustrated in FIG. 11, the permission policy table contains resource URLs indicating holding locations of resources, and ticket data indicating the status of tickets of the terminal 10 needed to access the corresponding resource URL. The permission policy table, for example, indicates that the ticket data of the terminal 10 needs to be (location, user rights, user status)=(at school, teacher, working) to access the resource represented by "http://foo.bar.com:8080/baz1". The permission policy table is a table pre-set by, for example, an administrator of the data management server 20.

The access determination section 23 includes a determination results table recorded with the history of access permission results to the resource URL by combination of token and resource URL. FIG. 12 is a diagram illustrating an example of a determination results table.

The example of the determination results table illustrated in FIG. 12 is recorded with the history that access to the resource URL "http://foo.bar.com:8080/baz1" was permitted for the token "20140214181020300-01", and access thereto was denied for the token "20140216181222302-02".

The access determination section 23 acquires the resource URL of the resource that has been requested by the terminal 10 through the electronic text data request notified by the relay section 21, and generates a combination (determination key) of the acquired resource URL, and the token notified by the relay section 21 together with the electronic text data request. The access determination section 23 then determines whether or not the determination key is present in the determination results table, and acquires the determination result corresponding to the determination key from the determination results table when the determination key is present, and notifies the determination result to the relay section 21.

However, when the determination key is not present in the determination results table, the access determination section 23 notifies the token management section 22 with the token. The token management section 22 that has received the token from the access determination section 23 references the token management table, and notifies the access determination section 23 with the ticket data corresponding to the received token. The access determination section 23 references the permission policy table, and determines whether or not the acquired resource URL is accessible with the ticket data received from the token management section 22. The access determination section 23 then notifies the determination result to the relay section 21, associates the determination key with the determination result and adds these to the determination results table.

The relay section 21 sends the electronic text data request to the resource server 40 specified by the electronic text data request only when the determination result notified from the access determination section 23 is "permitted".

The resource server 40 to which the electronic text data request is forwarded sends a response including the requested resource to the data management server 20.

When a response has been received from the resource server 40, the relay section 21 interrogates the token management section 22 as to whether or not the token has been updated. The token generation flag in the token management section 22 is then referenced, and the relay section 21 is notified that the token has been updated if the token generation flag is "true", and the relay section 21 is notified that the token has not been updated if the token generation flag is "false". When doing so, the token management section 22 provides the updated token to the relay section 21 if the token generation flag is "true", and returns the token generation flag to "false".

On receipt of an updated token from the token management section 22, the relay section 21 then adds the updated token to the header of the response received from the resource server 40, and relays these back to the terminal proxy 50 of the terminal 10 that originally sent the electronic text data request.

FIG. 13 is a diagram illustrating an example of a response to which an updated token has been attached.

As illustrated in FIG. 13, the updated token is attached to the header as a character string following on from "X-New-Token:". The region from <html> to </html> lists data of the resource acquired from the resource server 40.

Figure 14:
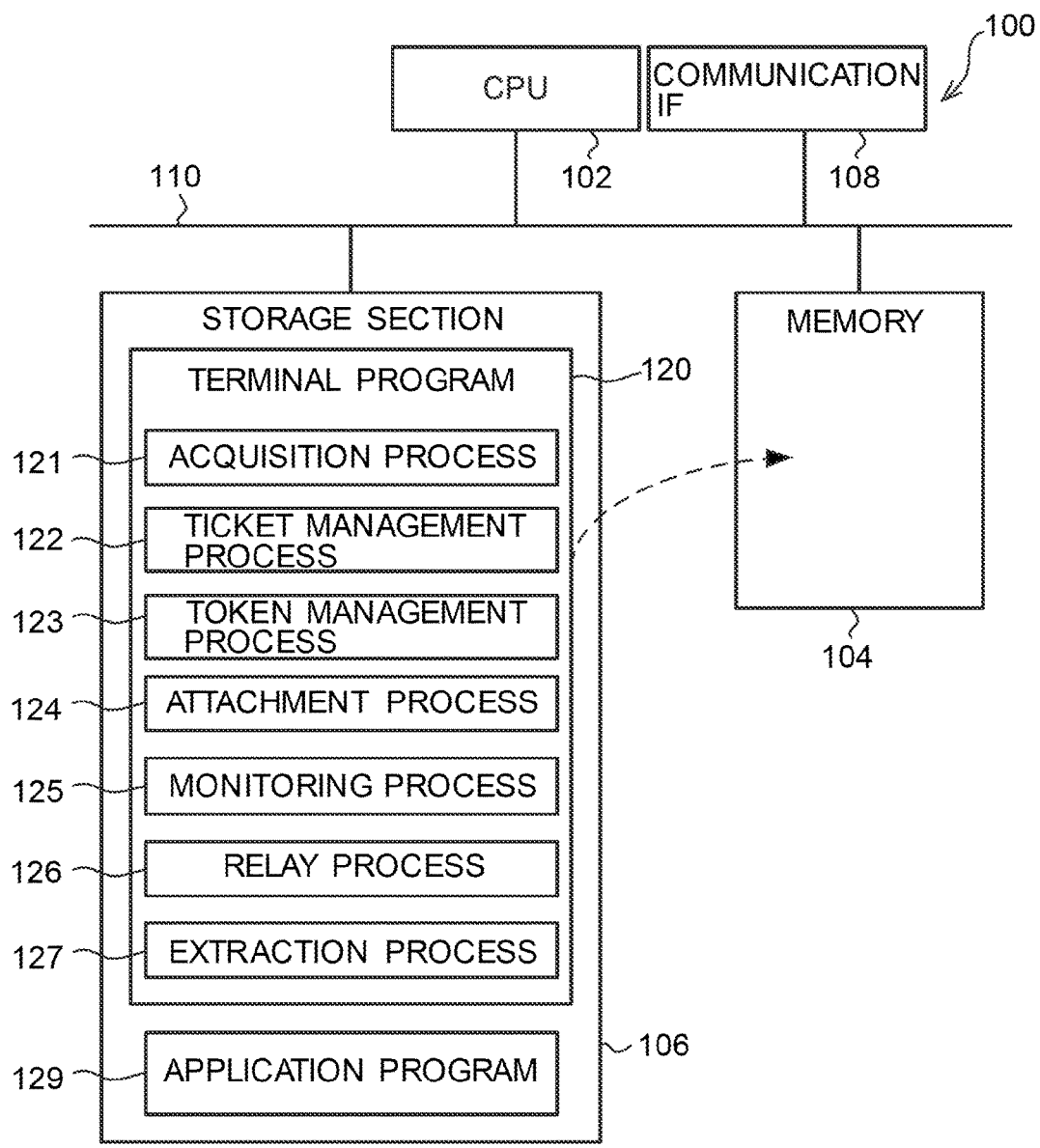
FIG. 14 is a block diagram illustrating a computer functioning as a terminal according to the first exemplary embodiment.

The terminal 10 as explained above may, for example, be implemented by a computer 100 as illustrated in FIG. 14. The computer 100 includes a CPU 102, a memory 104, a non-volatile storage section 106, and a communication interface (IF) 108, that are all mutually connected through a bus 110.

The storage section 106 may be implemented by a Hard Disk Drive (HDD), flash memory, or the like. A terminal program 120 to cause the computer 100 to function as the terminal 10, and an application program 129 are stored on the storage section 106 serving as a storage medium. The CPU 102 reads the terminal program 120 from the storage section 106, expands the terminal program 120 into the memory 104, and sequentially executes each of the processes of the terminal program 120. The communication IF 108 is connected to the communication line 30, and performs data exchange with the data management server 20. The CPU 102 also reads the application program 129 from the storage section 106, expands the application program 129 into the memory 104, and executes the application program 129. The application 60 is thereby executed on the terminal 10.

The terminal program 120 includes an acquisition process 121, a ticket management process 122, a token management process 123, an attachment process 124, a monitoring process 125, a relay process 126, and an extraction process 127.

The CPU 102 operates as the acquisition section 51 illustrated in FIG. 7 by executing the acquisition process 121. The CPU 102 operates as the ticket management section 52 illustrated in FIG. 7 by executing the ticket management process 122. The CPU 102 operates as the token management section 53 illustrated in FIG. 7 by executing the token management process 123. The CPU 102 operates as the attachment section 54 illustrated in FIG. 7 by executing the attachment process 124. The CPU 102 operates as the monitoring section 55 illustrated in FIG. 7 by executing the monitoring process 125. The CPU 102 operates as the relay section 56 illustrated in FIG. 7 by executing the relay process 126. The CPU 102 operates as the extraction section 57 illustrated in FIG. 7 by executing the extraction process 127.

Figure 15:
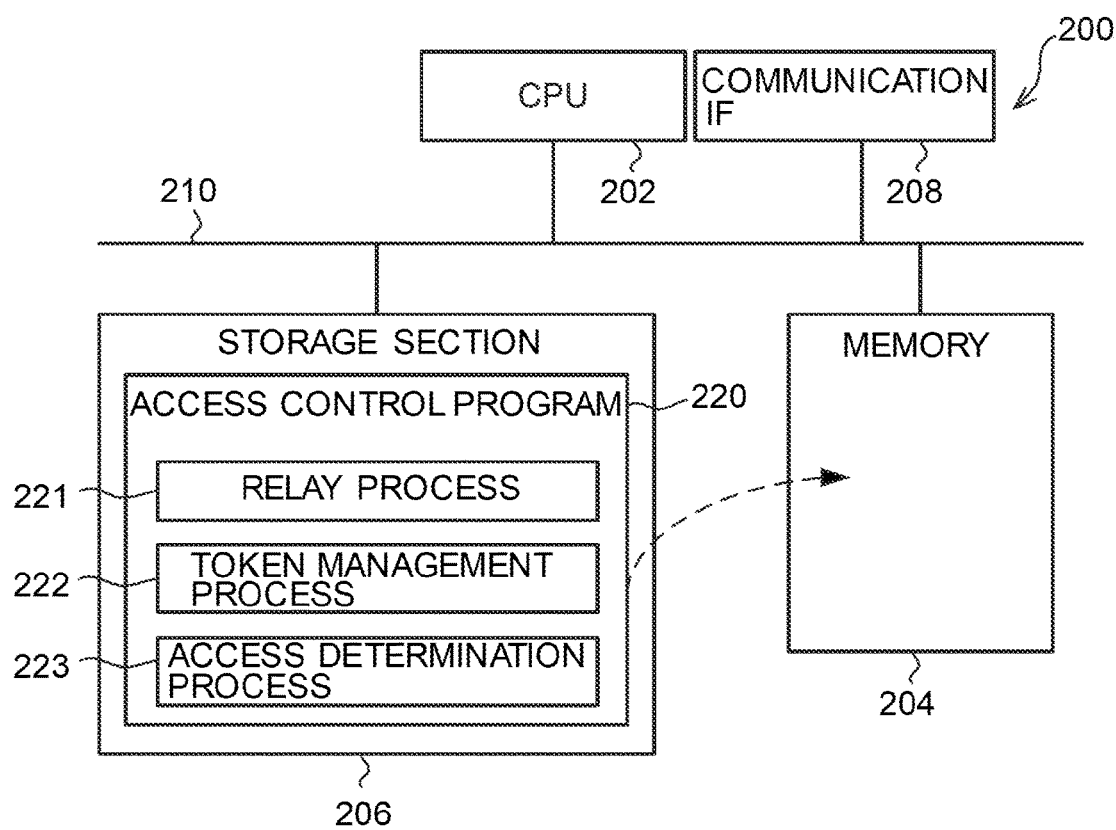
FIG. 15 is a block diagram illustrating a computer functioning as a data management server according to the first exemplary embodiment.

The computer 100 thereby operates as the terminal 10 by executing the terminal program 120 and the application program 129. The terminal 10 may be implemented by, for example, a semiconductor integrated circuit, and more specifically by an Application Specific Integrated Circuit (ASIC) or the like The data management server 20 may, for example, be implemented by a computer 200 illustrated in FIG. 15. The computer 200 includes a CPU 202, memory 204, a non-volatile storage section 206, and a communication IF 208, with these mutually connected through a bus 210.

The storage section 206 may be implemented by a HDD, flash memory, or the like. An access control program 220 to cause the computer 200 to function as the data management server 20 is stored on the storage section 206 serving as a storage medium. The CPU 202 reads the access control program 220 from the storage section 206, expands the access control program 220 into the memory 204, and sequentially executes each of the processes of the access control program 220. The communication IF 208 is connected to the communication line 30, and performs data exchange with the terminal 10 and the resource server 40.

The access control program 220 includes a relay process 221, a token management process 222, and an access determination process 223.

The CPU 202 operates as the relay section 21 illustrated in FIG. 7 by executing the relay process 221. The CPU 202 operates as the token management section 22 illustrated in FIG. 7 by executing the token management process 222. The CPU 202 operates as the access determination section 23 illustrated in FIG. 7 by executing the access determination process 223.

The computer 200 thereby operates as the data management server 20 by executing the access control program 220.

As an example, a real time clock is installed in the CPU 202, with a calendar function to provide current time data on request from the access control program 220. Similarly to the terminal 10, the data management server 20 may also be implemented by, for example, a semiconductor integrated circuit, and more specifically by an ASIC or the like.

Explanation next follows regarding operation of the terminal 10 and operation of the data management server 20 according to the present exemplary embodiment.

Figure 16:
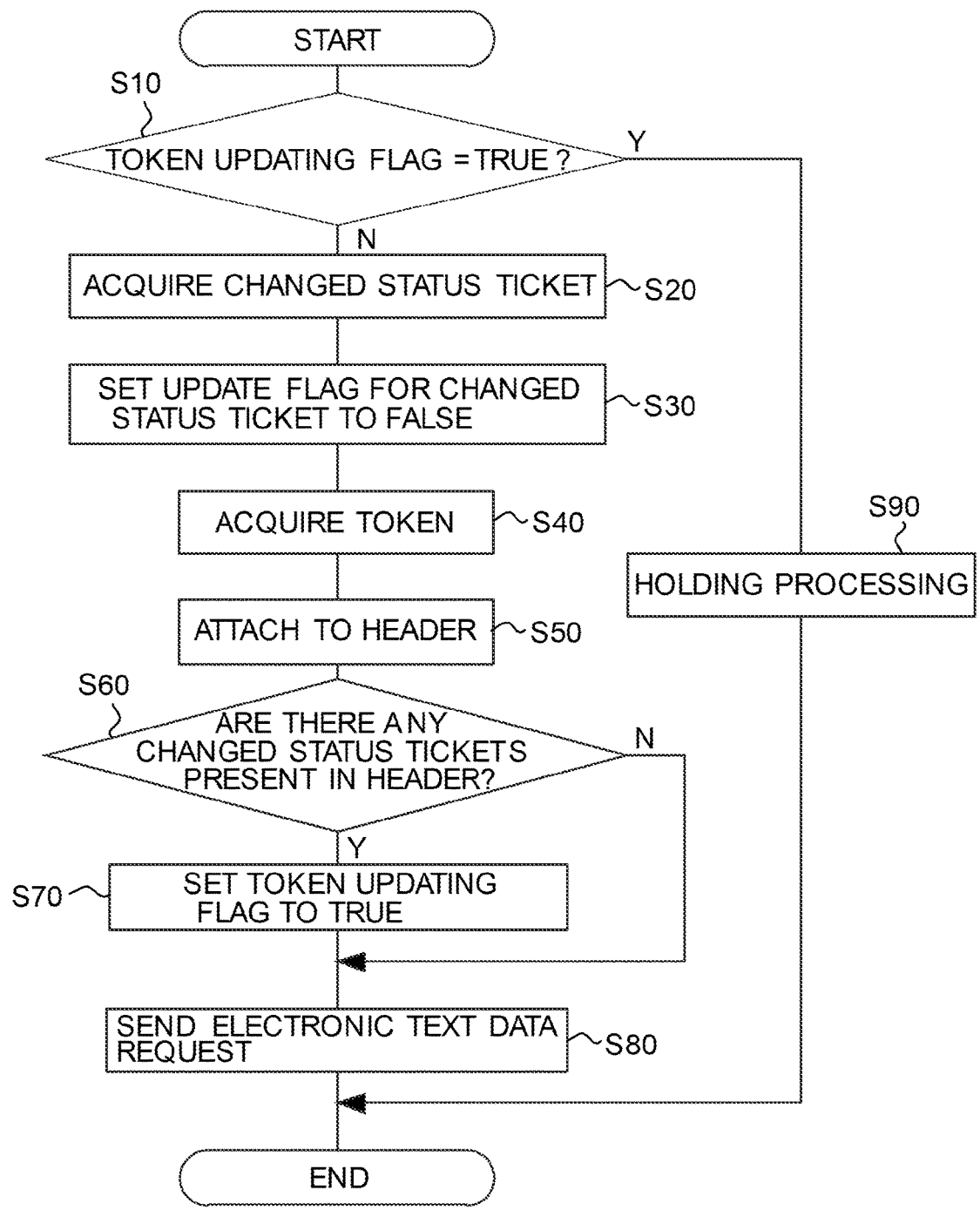
FIG. 16 is a flowchart illustrating electronic text data request relay processing in a terminal according to the first exemplary embodiment.

In the terminal 10 according to the present exemplary embodiment, the electronic text data request relay processing illustrated in FIG. 16 is executed on receipt of an electronic text data request from the application 60.

First, at step S10, the relay section 56 requests the monitoring section 55 for the status of the token updating flag, and determines whether or not the token updating flag is "true". Processing transitions to step S90 when affirmative determination is made, and the relay section 56 holds the received electronic text data request in a queue without sending to the data management server 20, and ends the electronic text data request relay processing. Processing transitions to step S20 if negative determination is made at the processing of step S10.

At step S20, the relay section 56 requests the attachment section 54 to attach a ticket to the header of the electronic text data request. When this is performed, the attachment section 54 makes a ticket request to the ticket management section 52, and the ticket management section 52 notifies the attachment section 54 of any tickets for which the update flag column of the ticket management table is "true". The attachment section 54 thereby acquires any changed status tickets.

At step S30, the ticket management section 52 sets to "false" the update flags of the ticket management table corresponding to tickets notified to the attachment section 54 by the processing of step S20, and updates the content of the ticket management table.

At step S40, the relay section 56 further requests the attachment section 54 to attach a token to the header of the electronic text data request. When this is performed, the attachment section 54 requests a token from the token management section 53, and the token management section 53 notifies the attachment section 54 of the retained token. The attachment section 54 thereby acquires the token.

At step S50, the attachment section 54 attaches any tickets acquired by the processing of step S20, and the token acquired by the processing of step S40, to the header of the electronic text data request. At this stage, the attachment section 54 does not attach a ticket to the header when no tickets have been notified from the ticket management section 52. Moreover, the attachment section 54 does not attach a token to the header when no token has been notified from the token management section 53.

Note that when there is no token present in the present exemplary embodiment, the update flags of the ticket management table corresponding to each of the tickets are set to "true". Moreover, when all the update flags of the ticket management table corresponding to each of the tickets are "false", then there is a token present corresponding to status of each of the tickets.

At step S60, the monitoring section 55 determines whether or not there are any tickets attached to the header of the electronic text data request. More specifically, the monitoring section 55 determines that there are no tickets attached to the header if the "X-Ticket-Num:" included in the header is "0", and determines that tickets are attached to the header if the "X-Ticket-Num:" is "1" or more. Processing transitions to step S70 if affirmative determination is made at the determination processing of step S60, and processing transitions to step S80, omitting the processing of step S70, if negative determination is made.

At step S70, due to the ticket status expressed by the token being different to the actual ticket status in the terminal 10, the monitoring section 55 sets the token updating flag stored in a predetermined region of the memory 104 to "true". The fact that the data management server 20 has been requested to update the token is thereby stored.

At step S80, the relay section 56 sends the electronic text data request attached with at least one out of the token or tickets to the data management server 20, and ends the electronic text data request relay processing.

Figure 17A:
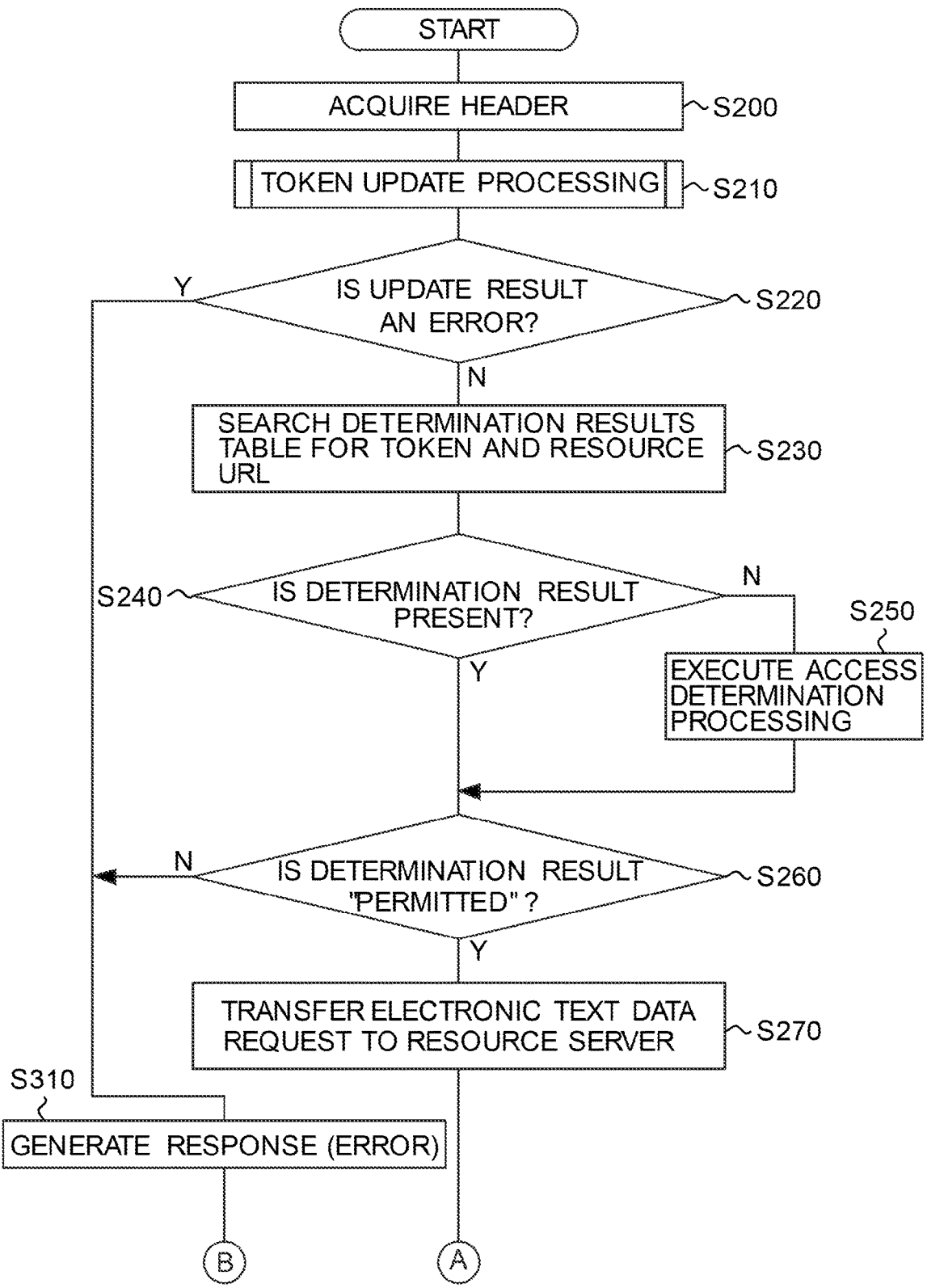
FIG. 17A is a flowchart illustrating response processing in a data management server according to the first exemplary embodiment.
Figure 17B:
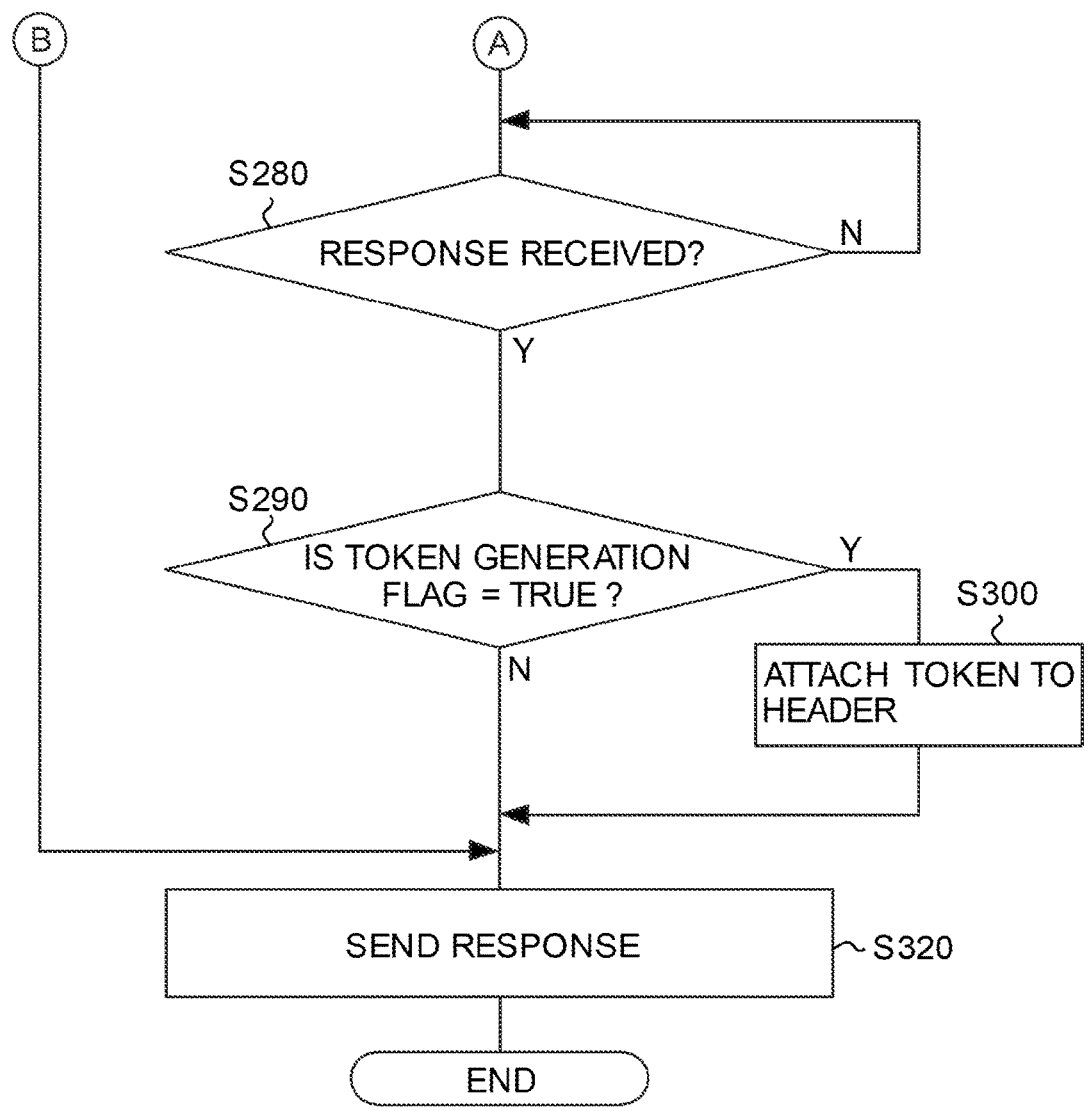
FIG. 17B is a flowchart illustrating response processing in a data management server according to the first exemplary embodiment.

On receipt of the electronic text data request from the terminal 10, the data management server 20 according to the present exemplary embodiment executes the response processing illustrated in FIG. 17A and FIG. 17B. The permission policy table, the token management table, and the determination results table are all pre-stored in the storage section 206. When expanding the access control program 220 into the memory 204, the CPU 202 expands the access control program 220 into a predetermined region of the memory 204.

First, at step S200, the relay section 21 notifies the token management section 22 of the received electronic text data request. The token management section 22 then, for example, stores the header of the notified electronic text data request in a predetermined region of the memory 204.

At step S210, the token management section 22 determines, from the combination of token and tickets included in the header acquired at step S200, whether or not there is a need to update the token, and executes token update processing to update the token based on the determination.

Figure 18B:
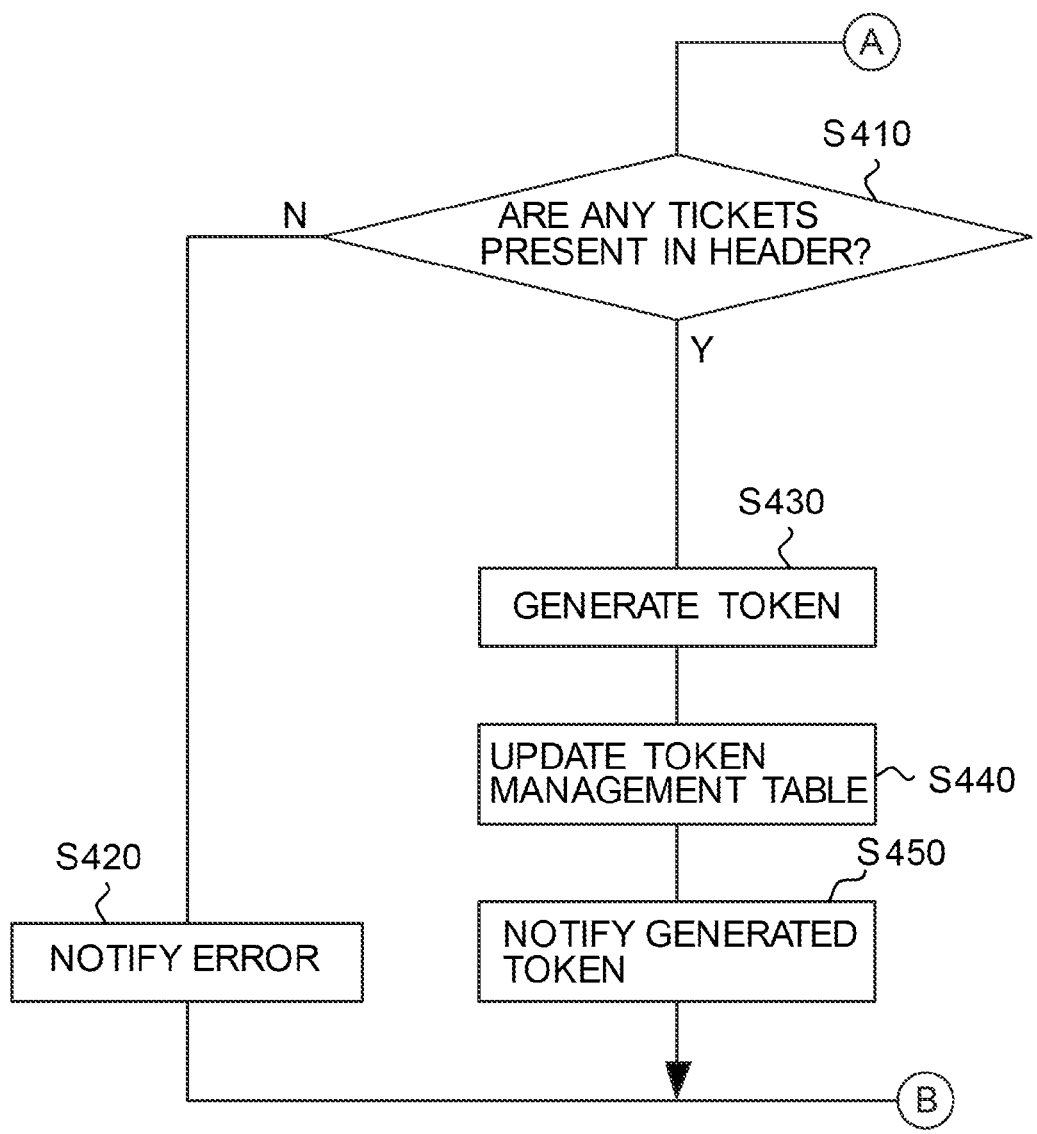
FIG. 18B is a flowchart illustrating token update processing in a data management server according to the first exemplary embodiment.

FIG. 18A and FIG. 18B illustrate a flowchart of the token update processing executed at step S210.

First, at step S400, the token management section 22 determines whether or not there is a token in the item "X-Token:" included in the header, and processing transitions to step S410 when negative determination is made.

Then at step S410, the token management section 22 furthermore determines whether or not there are any tickets present in the header by referencing the item "X-Ticket-Num:" included in the header. Determination is then made that there are no tickets present in the header if negative determination is made, namely if the "X-Ticket-Num:" is "0", and processing transitions to step S420. However, determination is that tickets are present in the header if affirmative determination is made, namely if the "X-Ticket-Num:" is "1" or more, and processing transitions to step S430.

At step S420, due to the header notified by the relay section 21 being an irregular header, containing neither a token nor tickets, the token management section 22 generates error data, notifies the error data to the relay section 21, and ends the token update processing.

At step S430, the token management section 22 requests time data, for example from the CPU 202, acquires the current time, and generates the token using the acquired time. When doing so, the token management section 22 sets the token generation flag stored in a predetermined region of the memory 204 to "true".

At step S440, the token management section 22 records the combination of the token generated at step S430, and the tickets included in the header, in the token management table expanded into the predetermined region of the memory 204. At step S450, the token management section 22 then notifies the token generated at step S430 to the relay section 21, and ends the token update processing.

Processing transitions to step S460 when the processing of step S400 determines that a token is included in the header.

At step S460, the token management section 22 acquires the token listed for the "X-Token:" item included in the header, and determines whether or not the acquired token matches the token registered in the token column of the token management table. Processing transitions to step S470 when negative determination is made, and processing transitions to step S480 when affirmative determination is made.

At step S470, the token sent from the terminal 10 is treated as an irregular token not registered in the token management table, and so the token management section 22 generates error data, notifies the error data to the relay section 21, and ends the token update processing.

At step S480, determination is made as to whether or not any tickets are present in the header by executing similar processing to the processing already explained for step S410. Processing transitions to step S490 if negative determination is made.

At step S490, the token management section 22 notifies the token acquired by the processing of step S460 to the relay section 21, and ends the token update processing. In such cases the content of the token management table is not updated since the token management section 22 does not generate a new token.

Processing transitions to step S500 if determined by the processing of step S480 that there is a ticket included in the header.

At step S500, a new token is generated by executing processing similar to the already explained processing of step S430. In such cases the token management section 22 sets the token generation flag stored in the predetermined region of the memory 204 to "true".

At step S510, the token management section 22 references the token management table, and acquires the ticket data corresponding to the token acquired at step S460. The token management section 22 then adds to the token management table a combination of new ticket data, in which the ticket included in the header replaces the corresponding ticket included in the acquired ticket data, and the token generated at step S500. The token management section 22 then, at step S520, notifies the token generated at step S500 to the relay section 21, and ends the token update processing.

The above processing thereby ends the token update processing of step S210 of FIG. 17A.

Then at step S220, the relay section 21 acquires from the token management section 22 an update result of the token update processing executed by the processing of step S210, and determines whether or not the update result is an error. The update result is an error when error data is notified by the processing of step S420 of FIG. 18B or step S470 of FIG. 18A.

Processing transitions to step S310 when determination at step S220 is affirmative determination, and at step S310, the relay section 21 generates a response denying access to the resource requested by the electronic text data request. Then at step S320, the relay section 21 sends the response to the terminal 10 that originally sent the electronic text data request.

Namely, if the update result of the token update processing at step S220 is an error, then the electronic text data request received from the terminal 10 is not relayed to the resource server 40, and a response generated by the data management server 20 indicating an error is returned to the terminal 10.

Processing transitions to step S230 when negative determination is made at step S220, namely when a token has been notified as the update result of the token update processing.

At step S230, the relay section 21 notifies the access determination section 23 of the token acquired as the update result of the processing of step S210, and the electronic text data request received from the terminal 10. The access determination section 23 acquires from the electronic text data request the resource URL of the resource requested by the terminal 10, and generates a determination key that is a combination of the token notified from the relay section 21 and the resource URL. The access determination section 23 then searches the determination results table stored in the predetermined region of the memory 204 for a token and resource URL combination matching the determination key.

Processing transitions to step S250 when, at step S240, the access determination section 23 has determined, based on the result of the search processing at step S230, that there is no combination of token and resource URL present matching the determination key. However, if determined that there is a combination of token and resource URL present matching the determination key, the access determination section 23 notifies the relay section 21 of the determination result for the row listing the token and the resource URL matching the determination key. Processing then transitions to step S260, omitting the processing of step S250.

Note that if the token acquired as the update result of the processing of step S210 is a newly generated token, then the access determination section 23 has not yet determined whether or not the resource is accessible using the token. The determination processing of step S240 is accordingly negative determination in such cases.

At step S250, the access determination section 23 notifies the token management section 22 of the token acquired as the update result of the processing at step S210, for which it has not yet ascertained the ticket data indicated by the token, and interrogates the token management section 22 for the ticket data indicated by the token. The token management section 22 references the token management table and notifies the access determination section 23 of the ticket data corresponding to the token received from the access determination section 23.

The access determination section 23 then references the permission policy table, and determines whether or not the resource URL acquired by the processing of step S230 is accessible with the ticket data received from the token management section 22. The access determination section 23 then notifies the relay section 21 of the determination result as to whether or not access is permitted. When this is performed, the access determination section 23 associates together the token acquired as the update result of the processing of step S210, the resource URL acquired by the processing of step S230, and the determination result indicating whether or not the resource URL is accessible, and adds them to the determination results table.

At step S260, the relay section 21 determines whether or not the determination result notified from the access determination section 23 by processing of step S240, or the determination result notified from the access determination section 23 by the processing of step S250, is "permitted".

Processing then transitions to step S270 when affirmative determination is made, namely when the access determination section 23 has permitted access to the resource indicated by the resource URL. Processing transitions to step S310 when negative determination is made, and a response is generated denying access to the resource requested by the electronic text data request from the relay section 21.

At step S270, the relay section 21 sends the electronic text data request received from the terminal 10 to the server indicated by the resource URL included in the electronic text data request, for example to the resource server 40.

At step S280, the relay section 21 determines whether or not a response has been received from the resource server 40, executing the processing of step S280 until such a response is received.

After a response has been received from the resource server 40, at step S290 the relay section 21 interrogates the token management section 22 for the value of the token generation flag, and determines whether or not the token generation flag is "true". Processing transitions to step S300 when negative determination is made, and processing transitions to step S320, omitting the processing of step S300, when affirmative determination is made.

At step S300, the relay section 21 attaches the value of the token generation flag, together with the updated token provided from the token management section 22, to the response received by the processing of step S280.

Then as already explained, at step S320, the relay section 21 then sends the response to the terminal 10 that originally sent the electronic text data request.

The above processing thereby concludes the response processing executed by the data management server 20.

Figure 19:
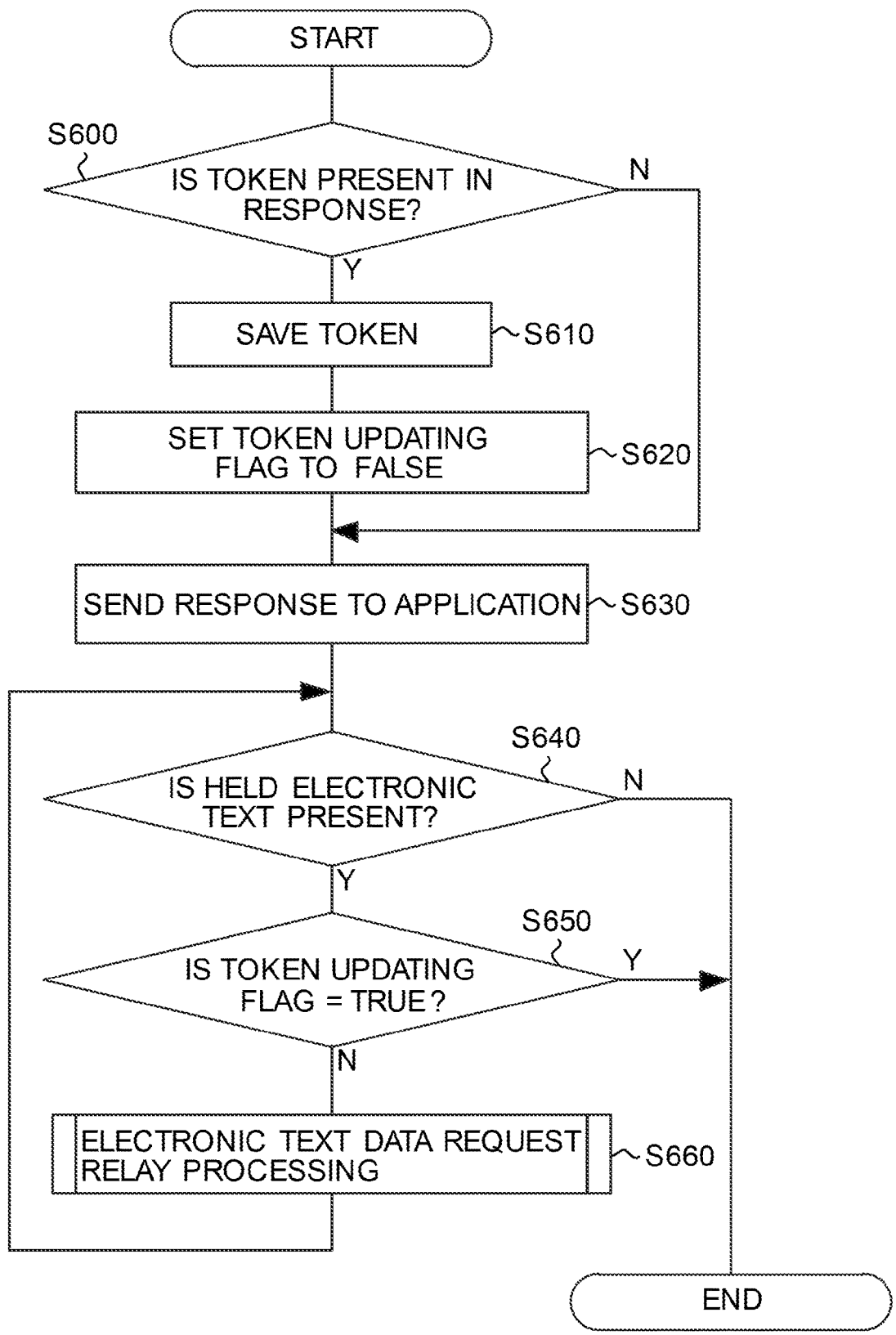
FIG. 19 is a flowchart illustrating held electronic text relay processing in a terminal according to the first exemplary embodiment.

Then, on receipt of the response from the data management server 20, the terminal 10 according to the present exemplary embodiment executes held electronic text relay processing as illustrated in FIG. 19.

First, at step S600, the relay section 56 forwards the received response to the monitoring section 55 and the extraction section 57. The extraction section 57 then determines whether or not a token is contained in the response. Processing transitions to step S610 when affirmative determination is made, and processing transitions to step S630 when negative determination is made.

At step S610, the extraction section 57 extracts the token from the response received by the processing of step S600, and notifies the token management section 53 with the extracted token. The token management section 53 retains the token notified from the extraction section 57 in the predetermined region of the memory 104. When doing so, if there is already a retained token present in the memory 104 then the token management section 53 overwrites and saves over that token. The token managed by the token management section 53 is thereby guaranteed to be the token most recently generated by the data management server 20.

Next at step S620, the monitoring section 55 confirms that there is a token contained in the response received by the processing of step S600, and sets the token updating flag to "false".

At step S630, the relay section 56 sends the received response to the application 60 that originally sent the electronic text data request corresponding to the response.

At step S640, the relay section 56 determines whether or not there is an electronic text data request present that is being held in a queue by the processing of step S90 of FIG. 16. The held electronic text relay processing is ended when negative determination is made, namely when there is no electronic text data request being held in a queue. Processing transitions to step S650 when affirmative determination is made.

At step S650, the relay section 56 requests the status of the token updating flag from the monitoring section 55, and determines whether or not token updating flag is "true". The held electronic text relay processing ends when affirmative determination is made. Processing transitions to step S660 when negative determination is made, and the relay section 56 removes one electronic text data request from the queue, and the electronic text data request relay processing explained with respect to FIG. 16 is executed on the removed electronic text data request.

By repeatedly executing the processing of steps S640 to S660, while the token update processing is "false" the relay section 56 sequentially sends electronic text data requests to the data management server 20 without waiting for a response to the electronic text data request being held in the queue.

The terminal 10 of the present exemplary embodiment thereby holds in the queue any electronic text data requests received in a token updating interval from when an electronic text data request attached with a ticket is sent to the data management server 20 up until the updated token for the electronic text data request is returned. Thus even if plural new electronic text data requests are received from the application 60 during the token updating interval, the number of times that an electronic text data request attached with a ticket is sent during the token updating interval is suppressed to one time only. Namely, this thereby enables the communication load on the terminal 10 to be reduced compared to cases in which the electronic text data request is sent to the data management server 20 each time an electronic text data request is received from the application 60 even during the token updating interval.

During the interval after the token updating interval, and while the token updating flag is "false", the terminal 10 of the present exemplary embodiment sends any held electronic text data requests to the data management server 20 in sequence without waiting for responses to other electronic text data requests. This thereby shortens the time needed to acquire the resources required for screen display in the application 60 compared with cases in which the following electronic text data request being held is sent after waiting for the response to the previously sent electronic text data request. This thereby raises the user friendliness of the application 60.

Second Exemplary Embodiment

Explanation next follows regarding a second exemplary embodiment of technology disclosed herein. Portions similar to those of the first exemplary embodiment are allocated the same reference numerals, and explanation thereof will be omitted, with explanation focusing on the portions that differ from the first exemplary embodiment.

The terminal 10 of the first exemplary embodiment is configured to hold all new electronic text data requests received from the application 60 in a queue during the token updating interval.

However, the user friendliness of the application 60 can be improved further by sending electronic text data requests received during the token updating interval to the data management server 20 without holding. Accordingly, a terminal of the second exemplary embodiment sends electronic text data requests to a data management server without holding, provided that the communication load is kept within a predetermined permissible range when electronic text data requests received during the token updating interval are attached with tickets and sent to the data management server 20.

Figure 20:
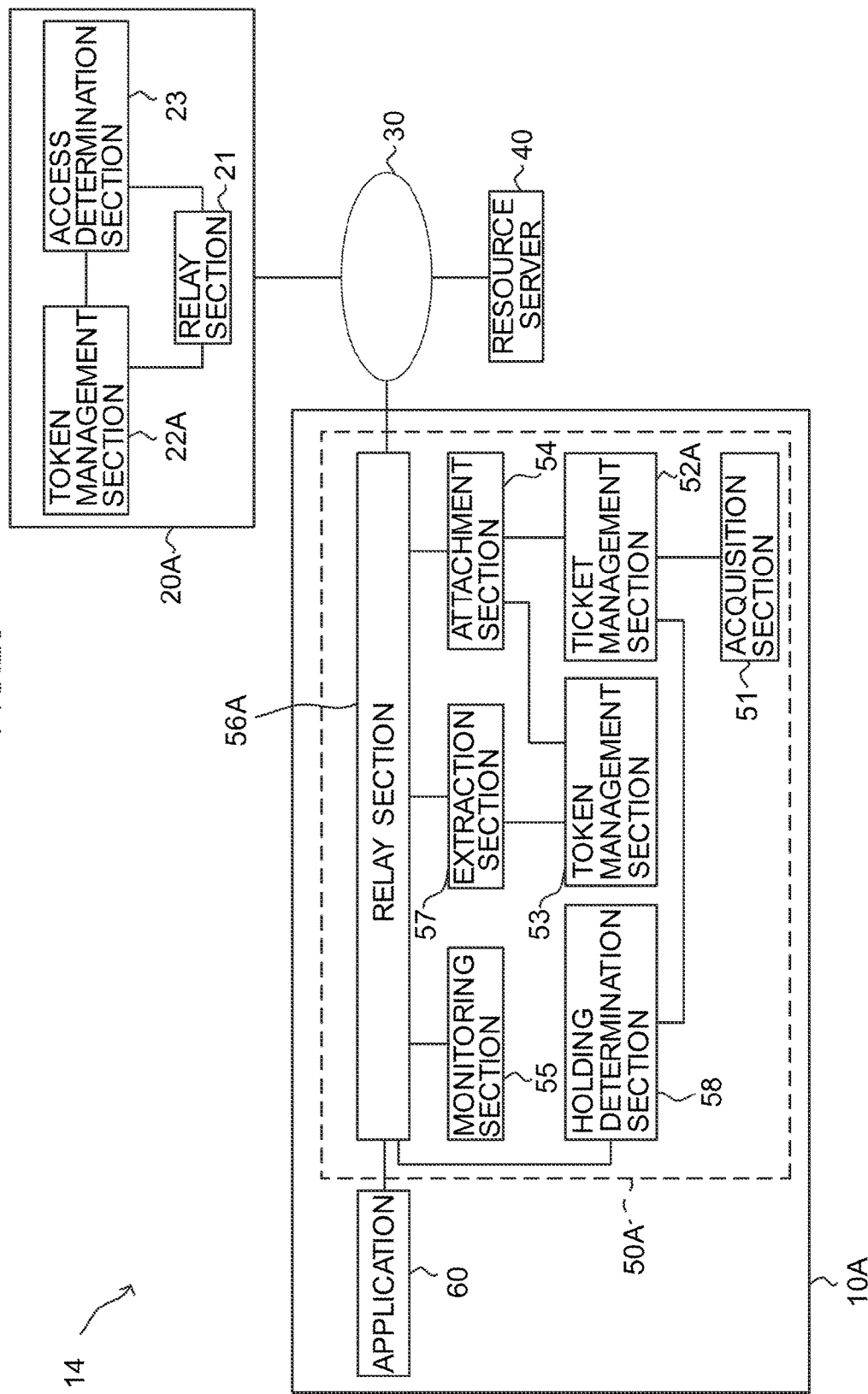
FIG. 20 is a diagram illustrating an example of a system including a terminal and a data management server according to a second exemplary embodiment.

FIG. 20 is a diagram illustrating a system 14 including a terminal 10A and a data management server 20A according to the second exemplary embodiment. Similarly to in the explanation accompanying FIG. 7 of the first exemplary embodiment, plural of the terminals 10A may be connected to the communication line 30; however FIG. 20 illustrates a single terminal 10A in order to simplify explanation.

The terminal 10A differs from the terminal 10 according to the first exemplary embodiment in that a holding determination section 58 is additionally provided to a terminal proxy 50A, and the relay section 56 and the ticket management section 52 are respectively replaced by a relay section 56A and a ticket management section 52A.

The holding determination section 58 is connected to the ticket management section 52A and the relay section 56A, and the holding determination section 58 determines whether or not to hold in a queue electronic text data requests received from the application 60 during the token updating interval. More specifically, the holding determination section 58 determines to send an electronic text data request to the data management server 20A without holding in a queue if the number of tickets attached to the electronic text data request is a predetermined number of tickets or fewer (a defined number of tickets). The defined number of tickets refers to a number of tickets attached to an electronic text data request for which the communication load of the terminal 10A will remain within the predetermined permissible range.

The holding determination section 58 interrogates the ticket management section 52A to acquire the number of tickets attached to an electronic text data request received during the token updating interval.

On receipt of an electronic text data request during the token updating interval, the relay section 56A interrogates the holding determination section 58 as to whether or not any received electronic text data requests are being held in a queue. The handling of the electronic text data request is decided according to the determination result thereof.

The data management server 20A differs from the data management server 20 of the first exemplary embodiment in that the token management section 22 is replaced by a token management section 22A.

Explanation follows regarding an issue encountered when employing the data management server 20 according to the first exemplary embodiment with the terminal 10A.

Figure 21:
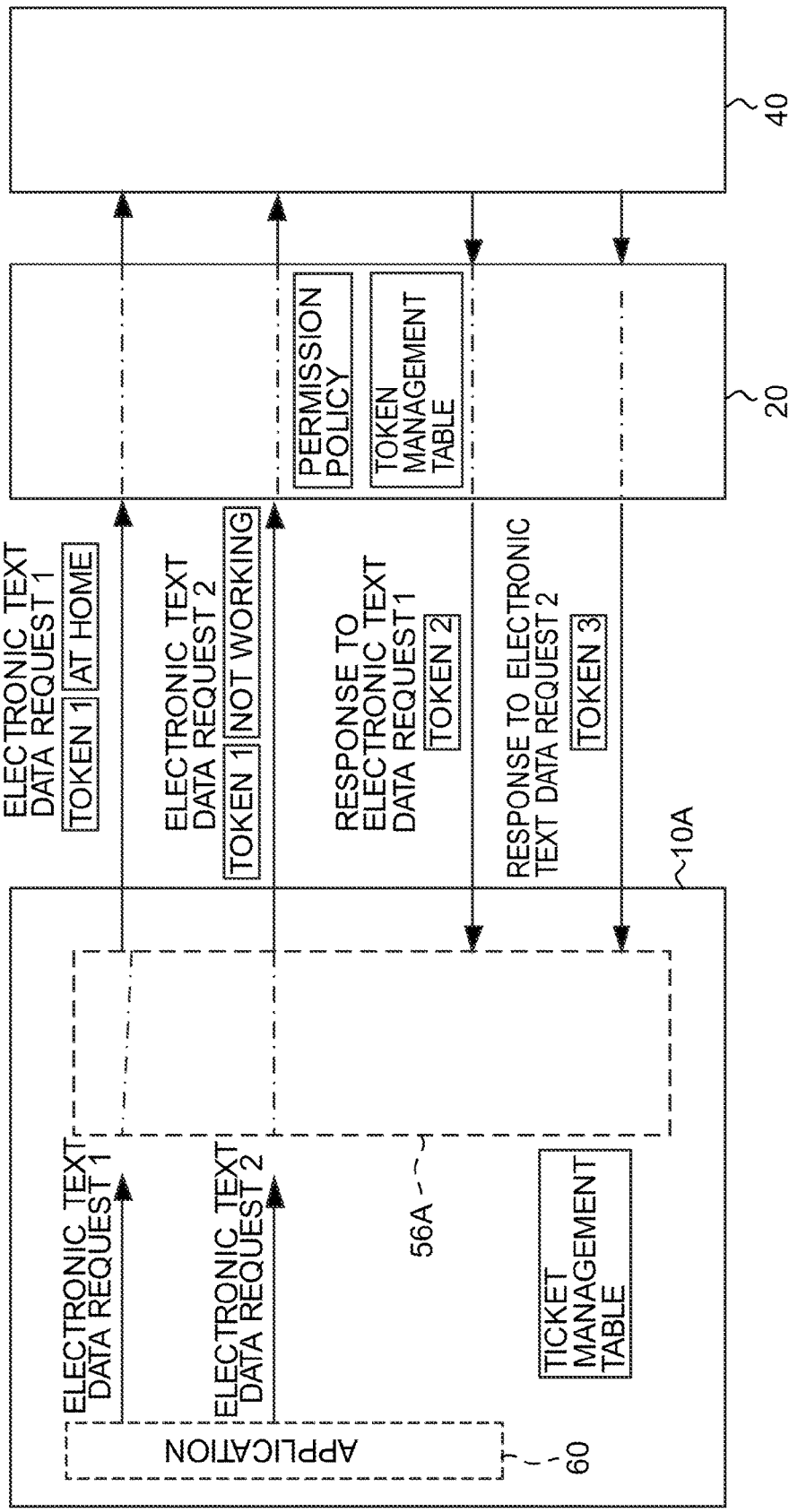
FIG. 21 is a diagram illustrating an example of token updating.

FIG. 21 is a diagram illustrating a token updating scenario when employing the data management server 20 with the terminal 10A.

Suppose the terminal 10A holds a token 1 for ticket data indicating (location, user rights, user status)=(at school, teacher, working). In such a case, were the relay section 56A to receive an electronic text data request 1 from the application 60 after the status of the ticket indicating the location "at school" had changed to "at home", the relay section 56A would attach the token 1 and the (location=at home) ticket to an electronic text data request 1 and send the electronic text data request 1 to the data management server 20.

Suppose that the relay section 56A were to receive an electronic text data request 2 from the application 60 during the token updating interval of the token for the electronic text data request 1, and after the status of the ticket indicating user status has changed from "working" to "not working" in the terminal 10. Here, were the holding determination section 58 to determine it unnecessary to hold the electronic text data request 2, the relay section 56A would attach the token 1 that is the token prior to updating, and the (user status=not working) ticket to the electronic text data request 2, and send them to the data management server 20.

The data management server 20 would generate a token 2 indicating that the ticket data for the electronic text data request 1 is (location, user rights, user status)=(at home, teacher, working), and send the token 2 to the terminal 10A. The data management server 20 would moreover generate a token 3 indicating that the ticket data for the electronic text data request 2 is (location, user rights, user status)=(at school, teacher, not working) and send the token 3 to the terminal 10A.

What is understood from the ticket data indicated by the token 3 therefore differs between the terminal 10A and the data management server 20. Namely, in the terminal 10A, the token 3 is employed as a token indicating the current ticket data of the terminal 10A (location, user rights, user status)=(at home, teacher, not working) However in the data management server 20, the token 3 is understood to be a token indicating ticket data of (location, user rights, user status)=(at school, teacher, not working).

In order to resolve such issues with conflicting ticket data, the token management section 22A manages the tokens using a ticket update management table in addition to the token management table.

FIG. 22 illustrates an example of a ticket update management table. The ticket update management table is a table containing session IDs uniquely identifying sessions for each terminal, update times of the ticket update management table, and updated ticket data indicating the tickets attached to electronic text data requests entailing token generation. A session referred to here is a unit corresponding to a series of changes to ticket data in the terminal 10A.

FIG. 23 is a diagram illustrating an example of a token management table employed by the token management section 22A. As illustrated in FIG. 23, the token management table according to the second exemplary embodiment is the token management table according to the first exemplary embodiment illustrated in FIG. 10, with an additional column for session IDs.

When requested by the terminal 10A for the first time to update a token, namely on receipt of an electronic text data request attached with only tickets rather than a token, the token management section 22A takes this as the start of a session cycle, and generates a session ID uniquely indicating the session. The token management section 22A then records the session ID and the tickets attached to the electronic text data request in the ticket update management table, together with the update time. The session ID may be any type of ID provided that it is a value uniquely indicating each session in each terminal 10A.

The token management section 22A then records the generated token and the ticket data corresponding to the token in the token management table, together with the session ID.

The token management section 22A thereafter references the token management table and acquires the session ID corresponding to the token each time an electronic text data request attached with the token and a ticket is received during the duration of the session. The token management section 22A records the ticket names of tickets attached to electronic text data requests in the ticket update management table by ticket type, together with the acquired session ID and update time. When this is performed, the token management section 22A for example records "-" in the columns corresponding to ticket types of any tickets not attached to the electronic text data request.

The token management section 22A then extracts from the ticket update management table all ticket update records with the same session ID as the acquired session ID, and arranges the extracted ticket update records in time sequence based on the update times of the ticket update records. The token management section 22A then reads the ticket update records arranged in time sequence from the oldest to the newest, and tracks the ticket name changes for each ticket type to acquire the latest ticket data for the terminal 10A.

For example, in the example illustrated in FIG. 22, the ticket name for the location ticket type is initially "at school", after which it changes to "at home". The ticket name for the user status ticket type moreover changes from "working" to "not working" In the example of the ticket update management table illustrated in FIG. 22, the latest ticket data at the update time 2014/2/14 18:10:20. 100 is thus determined to be (location, user rights, user status)=(at home, teacher, not working) Namely, tokens and ticket data can be associated correctly in the data management server 20A even when the terminal 10A sends the electronic text data request 2 during the token updating interval, as illustrated in FIG. 21.

Figure 24:
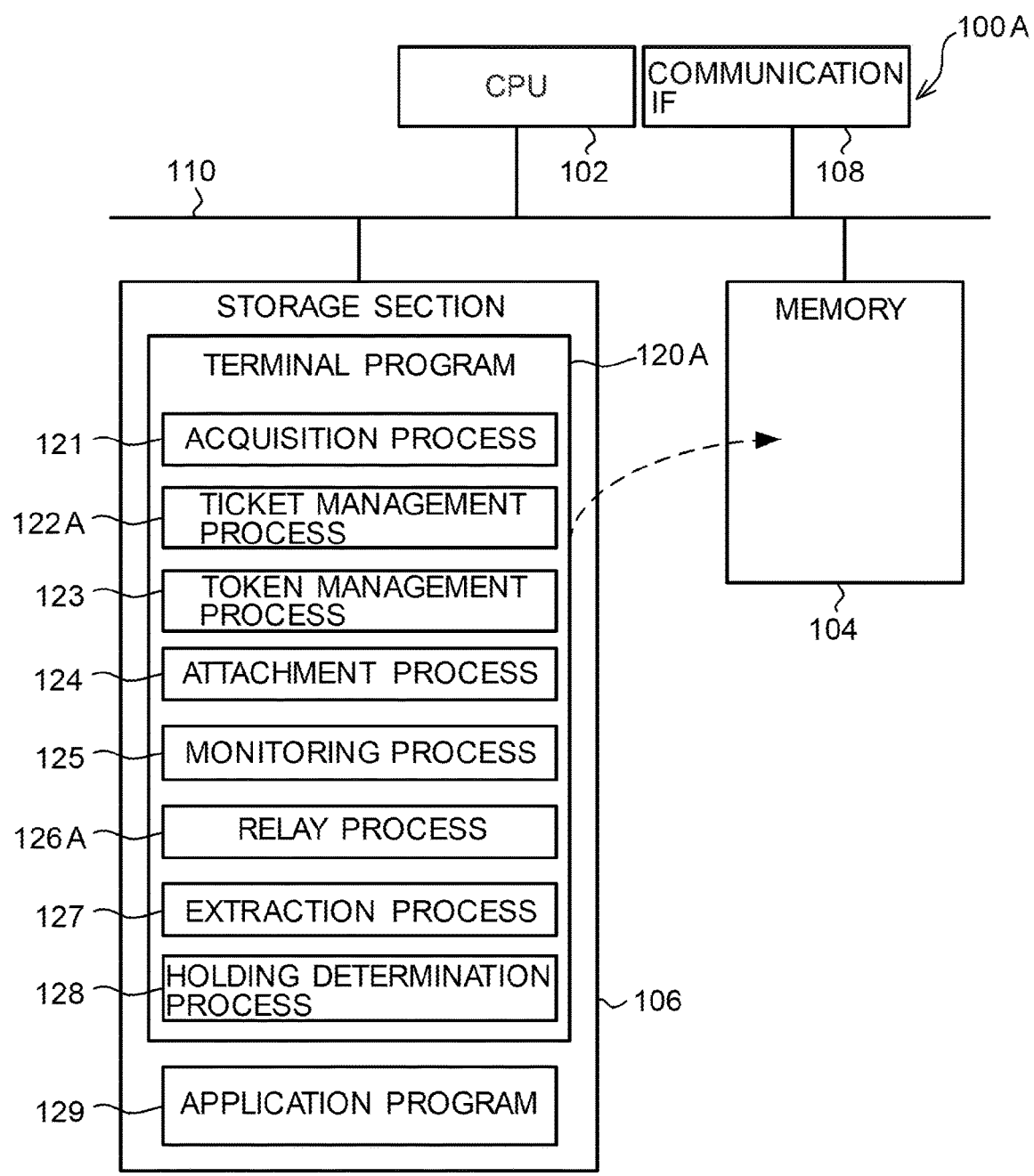
FIG. 24 is a block diagram illustrating a computer functioning as a terminal according to the second exemplary embodiment.

The terminal 10A described above may, for example, be implemented by a computer 100A illustrated in FIG. 24.

A terminal program 120A to cause the computer 100A to function as the terminal 10A, and an application program 129 are stored on a storage section 106 serving as a storage medium. The terminal program 120A differs from the terminal program 120 according to the first exemplary embodiment in that it includes a holding determination process 128, the ticket management process 122 is substituted for a ticket management process 122A, and the relay process 126 is substituted for a relay process 126A. The CPU 102 operates as the ticket management section 52A illustrated in FIG. 20 by executing the ticket management process 122A. The CPU 102 also operates as the relay section 56A illustrated in FIG. 20 by executing the relay process 126A. The CPU 102 operates as the holding determination section 58 illustrated in FIG. 20 by executing the holding determination process 128.

As described above, the computer 100A operates as the terminal 10A by executing the terminal program 120A and the application program 129.

Figure 25:
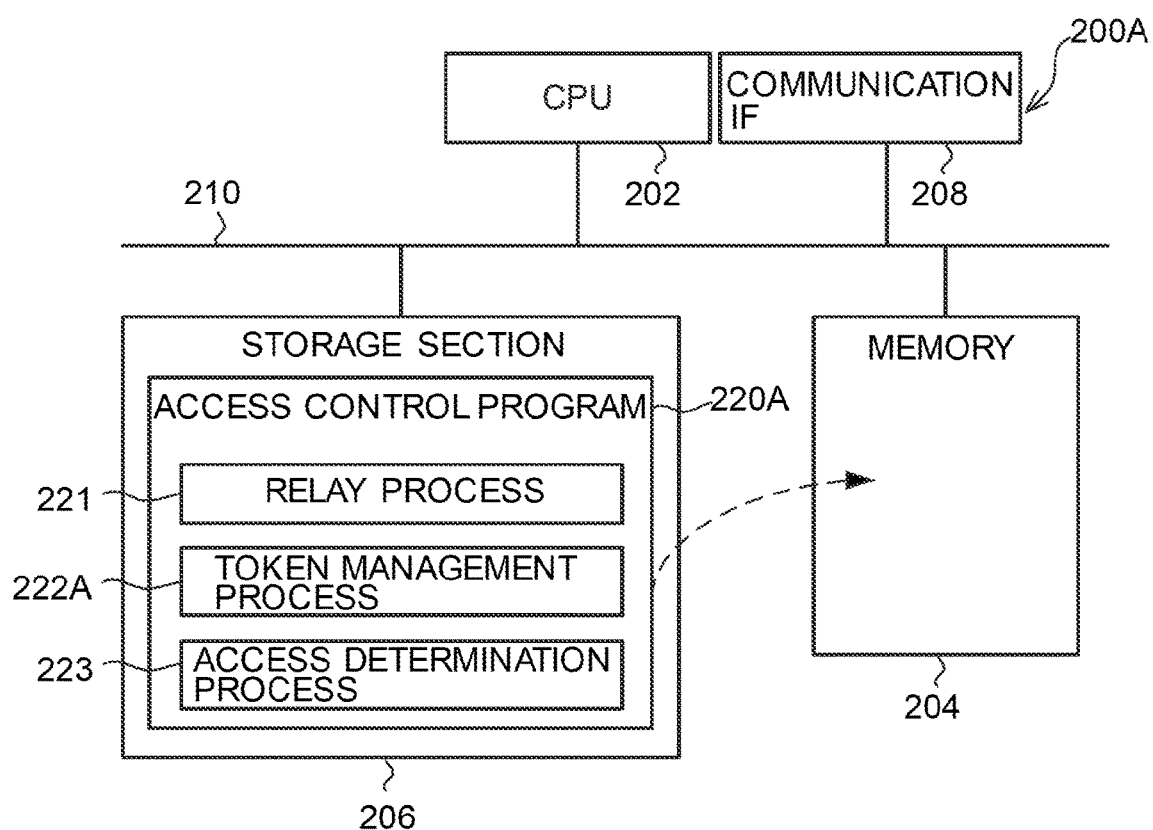
FIG. 25 is a block diagram illustrating a computer functioning as a data management server according to the second exemplary embodiment.

The data management server 20A may, for example, be implemented by a computer 200A illustrated in FIG. 25.

An access control program 220A to cause the computer 200A to function as the data management server 20A is stored on a storage section 206 serving as a storage medium.

The access control program 220A differs from the access control program 220 according to the first exemplary embodiment in that the token management process 222 is substituted for a token management process 222A. The CPU 202 operates as the token management section 22A illustrated in FIG. 20 by executing the token management process 222A.

As described above, the access control program 220A operates as the data management server 20A by executing the access control program 220A.

Both the terminal 10A and the data management server 20A may, for example, be implemented by a semiconductor integrated circuit, and more specifically by an ASIC or the like.

Next, explanation follows regarding operation of the terminal 10A and operation of the data management server 20A. On receipt of an electronic text data request from the application 60, the terminal 10A executes the electronic text data request relay processing illustrated in FIG. 26.

Figure 26:
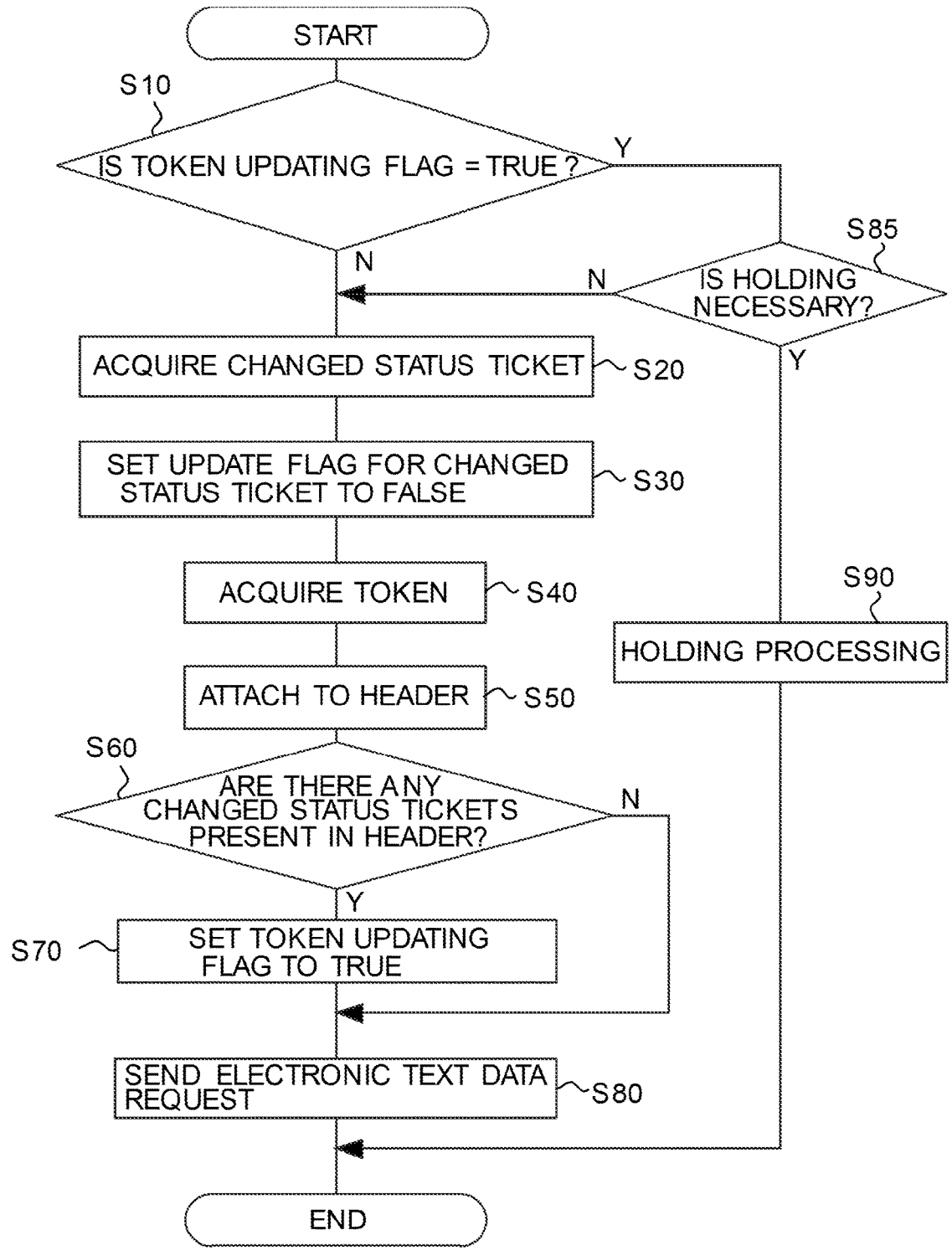
FIG. 26 is a flowchart illustrating electronic text data request relay processing in a terminal according to the second exemplary embodiment.

The electronic text data request relay processing illustrated in FIG. 26 differs from the electronic text data request relay processing according to the first exemplary embodiment illustrated in FIG. 16 in the provision of an additional step S85. The processing of the other respective steps is similar to that in the first exemplary embodiment, and so explanation thereof will be omitted.

Processing transitions to step S85 when determination is negative at step S10, and the relay section 56A then determines whether or not it is necessary to hold the electronic text data request in a queue. More specifically, the relay section 56A interrogates the holding determination section 58 as to whether or not the received electronic text data request should be held in a queue. When thus interrogated, the holding determination section 58 interrogates the ticket management section 52A for the number of changed status tickets. The ticket management section 52A then references the ticket management table and notifies the holding determination section 58 of the number of tickets for which the update flag is "true".

If the number of changed status tickets is a predetermined value K or lower (wherein K is an integer of 0 or greater), the holding determination section 58 notifies the relay section 56A of a determination result that there is no need to hold the electronic text data request in a queue. If the number of changed status tickets is greater than the value K, the holding determination section 58 notifies the relay section 56A with a determination result that it is necessary to hold the electronic text data request in a queue.

Processing transitions to step S90 when, based on the determination result from the holding determination section 58, the relay section 56A determines that it is necessary to hold the electronic text data request in a queue, and the electronic text data request is held in a queue. Processing transitions to step S20 when, based on the determination result from the holding determination section 58, the relay section 56A determines that there is no need to hold the electronic text data request in a queue, and the electronic text data request is sent to the data management server 20A.

On receipt of an electronic text data request from the terminal 10A, the data management server 20A executes the response processing illustrated in FIG. 17A and FIG. 17B. However, the token update processing at step S210 is replaced by the token update processing illustrated in FIG. 27A and FIG. 27B.

Figure 27A:
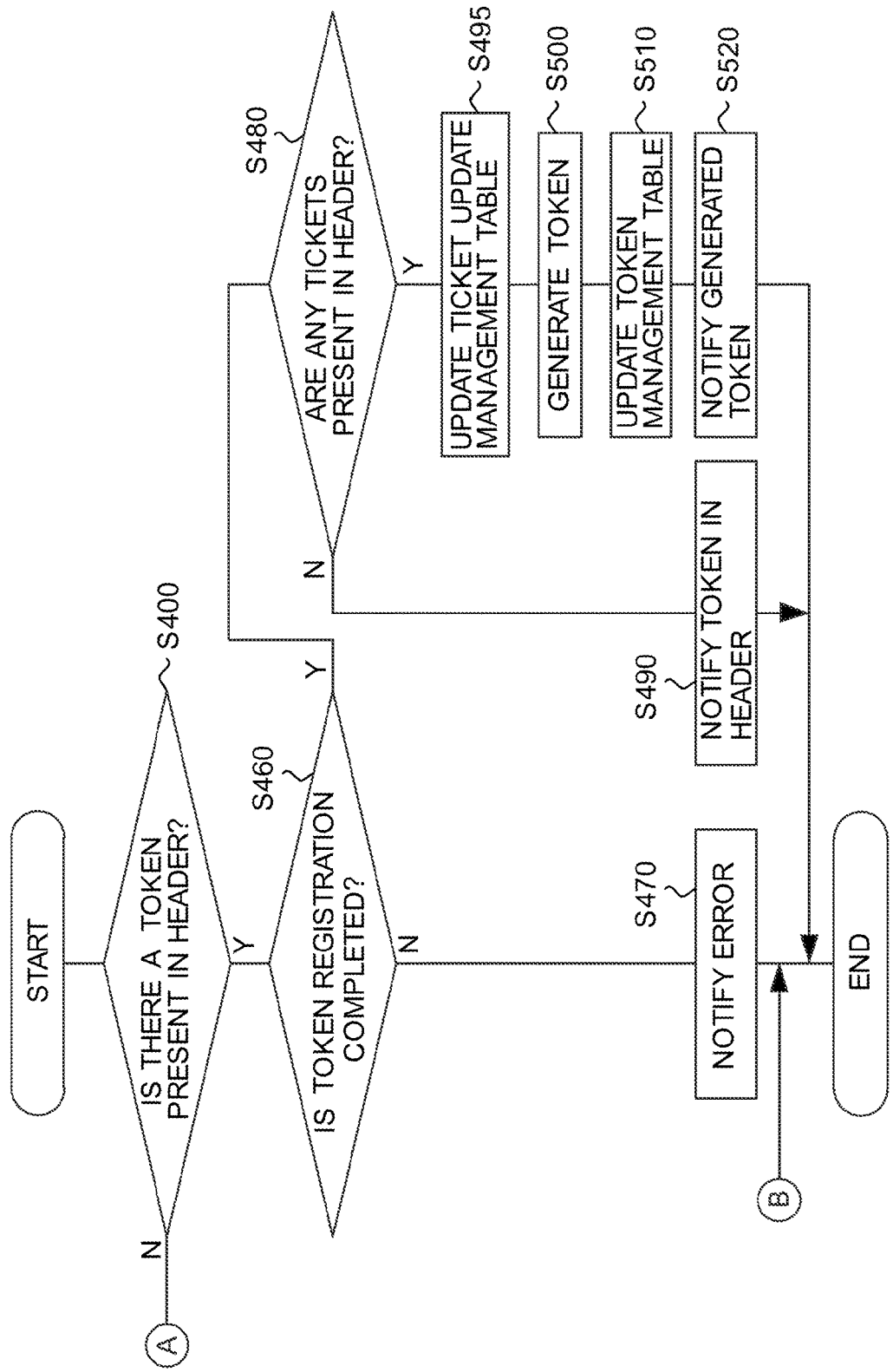
FIG. 27A is a flowchart illustrating token update processing in a data management server according to the second exemplary embodiment.
Figure 27B:
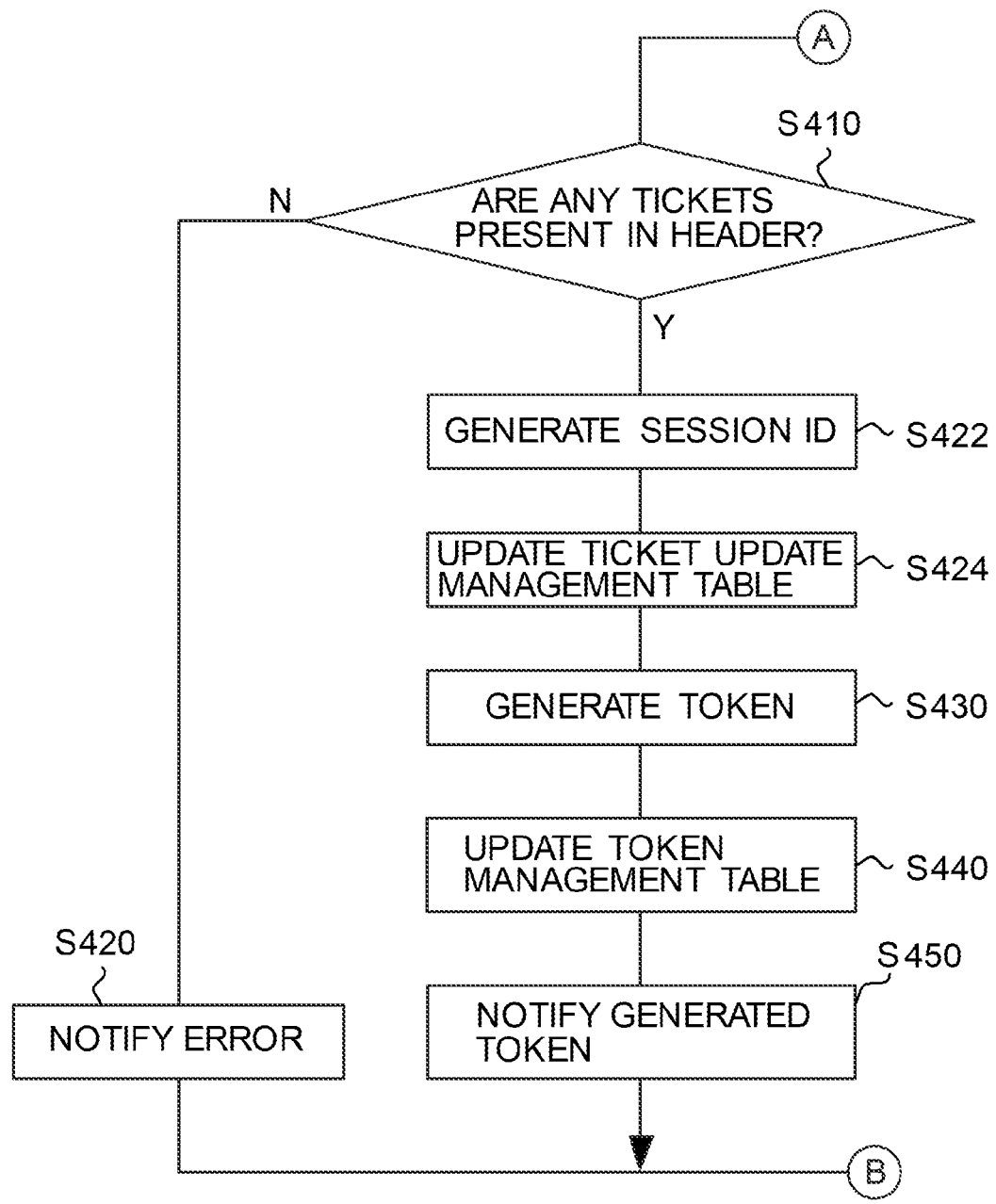
FIG. 27B is a flowchart illustrating token update processing in a data management server according to the second exemplary embodiment.

The token update processing illustrated in FIG. 27A and FIG. 27B differs from the token update processing according to the first exemplary embodiment illustrated in FIG. 18A and FIG. 18B in the provision of additional steps S422, S424, and S495. The processing of the other respective steps is similar to that in the first exemplary embodiment, and so explanation thereof will be omitted.

Processing transitions to step S422 when determination is affirmative at step S410, and the token management section 22A generates a session ID at the start of a session. The terminal 10A that sent the electronic text data request may, for example, be identified using sender data or the like of the electronic text data request attached by the application 60.

At step S424, the token management section 22A associates the session ID generated at step S422 with the tickets attached to the electronic text data request, and adds them to the ticket update management table, together with the update time.

In order to update the token management table illustrated in FIG. 23 at step S440, after generating the token indicating the tickets attached to the electronic text data request at step S430, the token management section 22A records the token in the token management table, together with the session ID generated at step S422.

The token management section 22A makes affirmative determination at step S480 if an electronic text data request attached with a token and a ticket has been received from the relay section 21, and processing transitions to step S495.

At step S495, the token management section 22A references the token management table, and searches the row where a token matching the received token is recorded in the token column of the token management table, to acquire the session ID of that row. The token management section 22A then associates the acquired session ID with any tickets attached to the electronic text data request and adds them to the ticket update management table, together with the update time.

At step S510, the token management section 22A references the ticket update management table for the ticket update records with the session ID acquired at step S495 in sequence from the oldest, thereby acquiring the latest ticket data for the terminal 10A. The token management section 22A associates together the ticket data acquired at step S510, the session ID acquired at step S495, and the token generated at step S500, and adds them to the token management table.

The above processing thereby ends the token update processing of step S210, enabling the token and ticket data to be associated with each other correctly.

On receipt of a response from the data management server 20A, the terminal 10A according to the present exemplary embodiment then executes the held electronic text relay processing illustrated in FIG. 19, already described above.

The data management server 20A according to the second exemplary embodiment accordingly enables tokens to be generated that are correctly associated with each ticket status in the terminal 10A, even when an electronic text data request is received during the token updating interval.

The holding determination section 58 determines whether or not to hold an electronic text data request in a queue based on the number of tickets attached thereto, however the holding determination section 58 may also employ another reference for holding determination that reflects whether or not the communication load on the terminal 10A will be kept within the predetermined permissible range.

For example, electronic text data requests may be sent to the data management server 20A without holding in a queue even with tickets attached to the electronic text data request, provided that the data volume of the tickets attached to the electronic text data request is a data volume such that the communication load on the terminal 10A will be contained within the predetermined permissible range, or a lower data volume. In such cases, the ticket management section 52A manages the data volume of each ticket in the ticket management table.

Alternatively, the holding determination section 58 may determine whether or not to hold an electronic text data request in a queue according to the resource type requested by the electronic text data request.

For example, if the requested resource type is a video, due to having a larger data volume than a still image, more time is taken from the application 60 requesting the resource until the resource is actually received. Accordingly, if the resource type requested by the application 60 is a video, the holding determination section 58 may send the electronic text data request to the data management server 20A without holding in a queue even during the token updating interval. This thereby shortens the waiting time until the video is displayed by the application 60, thereby raising the user friendliness of the application 60.

A requested resource type of a still image has a smaller data volume than a video, and so less time may be expected to be taken from the application 60 requesting the resource until the resource is actually received than for a video, even were the electronic text data request to be held in a queue.

The holding determination section 58 may acquire the type of resource requested by the electronic text data request by reading the file extension of the resource included in the electronic text data request (for example ".jpg" for still images and ".mpg" for video).

Third Exemplary Embodiment

Explanation follows regarding a third exemplary embodiment that is a modified example of the second exemplary embodiment.

A holding determination section in a terminal according to the third exemplary embodiment identifies the application that sent the electronic text data request, and determines whether or not to hold the electronic text data request in a queue based on the number of electronic text data requests per unit time sent by the application (sending frequency).

For example, consider a case in which the sending frequency of electronic text data requests by an application is a frequency (defined frequency) at which the load on the terminal exceeds the predetermined permissible range of the communication load, or a higher frequency. In such cases, there is a risk of the communication load on the terminal increasing if electronic text data requests received from the application during the token updating interval are not held.

Conversely, suppose for example that the sending frequency of electronic text data requests by an application is below the defined frequency. In such cases, the risk of the communication load on the terminal increasing may be expected to be low even if electronic text data requests received from the application during the token updating interval are not held.

The sending frequency of data request processing is accordingly calculated for each application. The communication load on the terminal can be reduced by determining whether or not to hold an electronic text data request received during the token updating interval based on the calculated sending frequencies.

Figure 28:
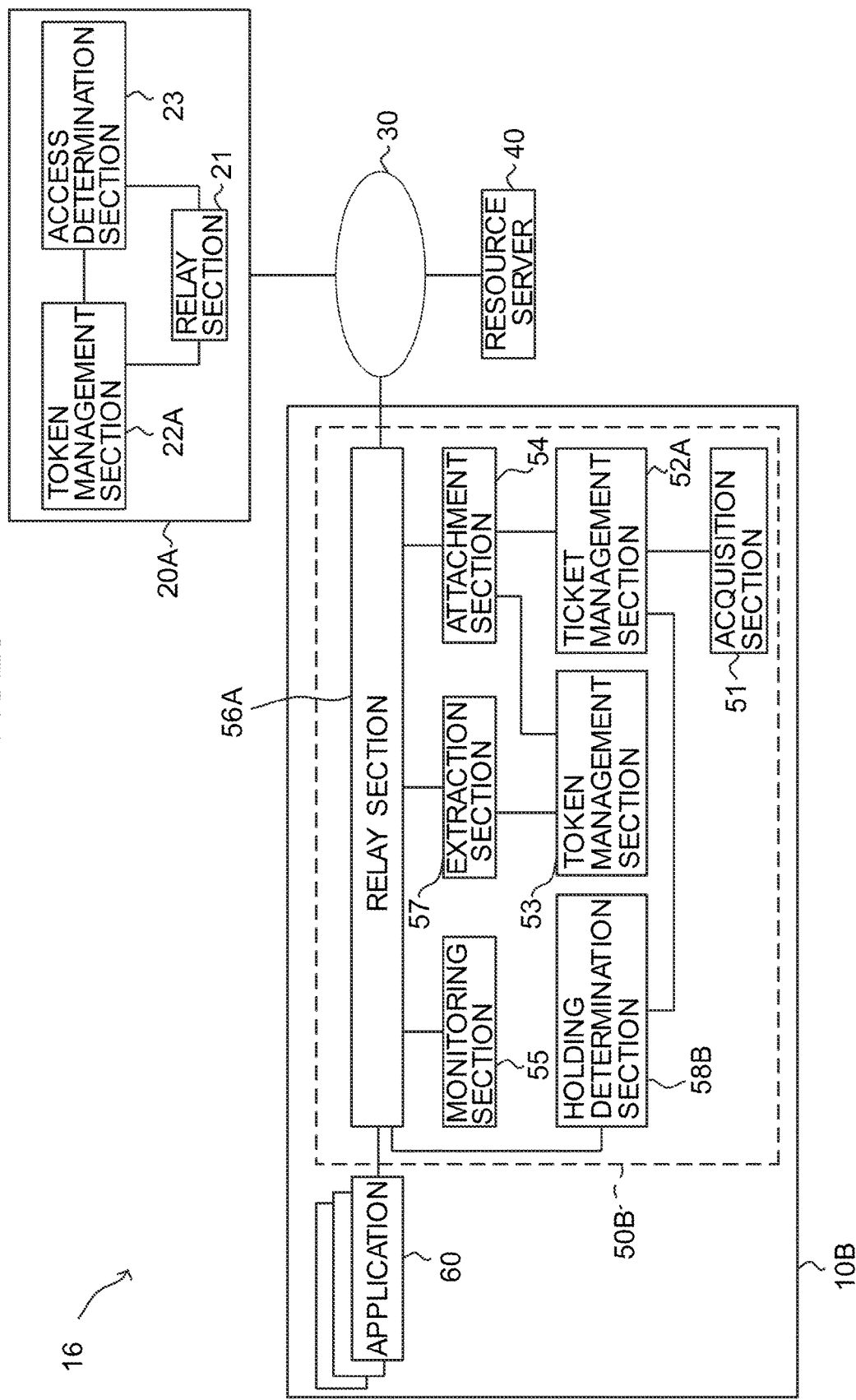
FIG. 28 is a diagram illustrating an example of a system including a terminal and a data management server according to a third exemplary embodiment.

FIG. 28 is a diagram illustrating a system 16 including a terminal 10B and a data management server 20A according to the third exemplary embodiment. A terminal proxy 50B of the terminal 10B differs from the terminal proxy 50A of the second exemplary embodiment in that the holding determination section 58 is substituted with a holding determination section 58B.

The holding determination section 58B calculates the sending frequency of electronic text data requests sent by the relay section 56A for each application 60, and records the sending frequencies in a sending frequency table. FIG. 29 is a diagram illustrating an example of a sending frequency table including application names and the electronic text data request sending frequency corresponding to each application.

If, for example, the electronic text data requests are electronic text in http format, User-Agent data included in the header may be used to identify the application 60 that sent the electronic text data request. The User-Agent includes the name of the application that sent the electronic text data request. However, the method used to identify the sender of the electronic text data request is not limited thereto. For example, the application 60 that sent an electronic text data request may be identified by employing a function of the operating system (OS) installed in the terminal 10B to identify the process using the originating port number that is the originating port number of the communication path by which the electronic text data request is received.

On interrogation by the relay section 56A as to whether or not to hold an electronic text data request according to application name, the holding determination section 58B references the sending frequency table to acquire the sending frequency for the specified application name. The holding determination section 58B then compares the acquired sending frequency against the defined frequency, and the holding determination section 58B notifies the relay section 56A to hold the electronic text data request if the sending frequency is the defined frequency or above. The holding determination section 58B notifies the relay section 56A not to hold the electronic text data request if the sending frequency is below the defined frequency.

Figure 30:
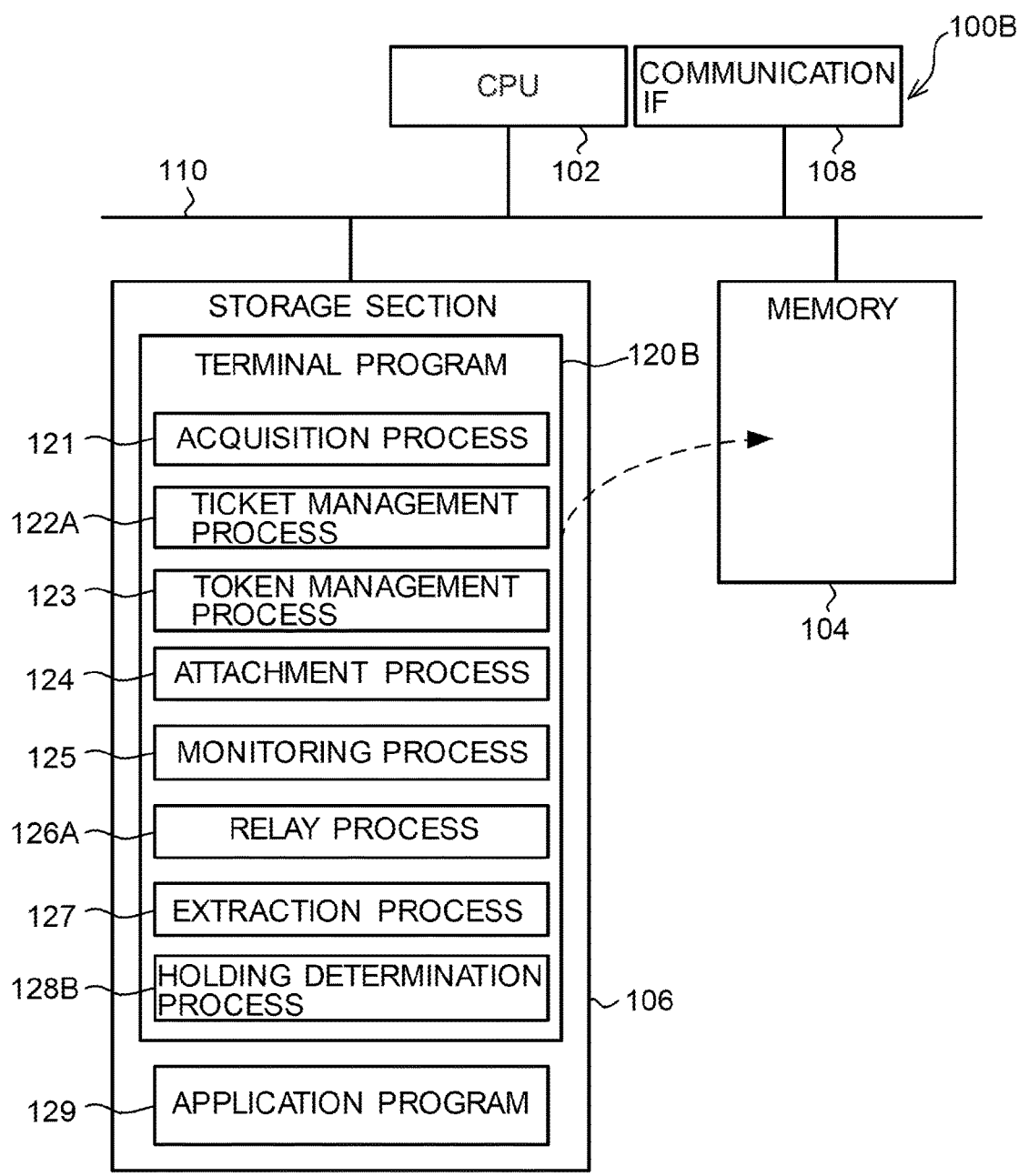
FIG. 30 is a block diagram illustrating a computer functioning as a terminal according to the third exemplary embodiment.

The terminal 10B described above may, for example, be implemented by a computer 100B, illustrated in FIG. 30.

A terminal program 120B to cause the computer 100B to function as the terminal 10B, and an application program 129, are stored on a storage section 106 serving as a storage medium. The terminal program 120B differs from the terminal program 120A according to the second exemplary embodiment in that the holding determination process 128 is substituted with a holding determination process 128B.

The CPU 102 operates as the holding determination section 58B illustrated in FIG. 28 by executing the holding determination process 128B.

Next, explanation follows regarding operation of the terminal 10B. On receipt of an electronic text data request from the application 60, the terminal 10B executes the electronic text data request relay processing illustrated in FIG. 26, explained with reference to the second exemplary embodiment. However, for the terminal 10B according to the third exemplary embodiment, the processing differs at step S85.

At step S85, the relay section 56A determines whether or not it is necessary to hold the electronic text data request in a queue. More specifically, the relay section 56A acquires the name of the application that sent the electronic text data request from the User-Agent included in the header of the received electronic text data request. The relay section 56A interrogates the holding determination section 58B as to whether or not received electronic text data requests should be held in a queue, according to the acquired application name.

In response to the interrogation, the holding determination section 58B searches to see whether or not the application name notified by the relay section 56A is present in the application name column of the sending frequency table to acquire the sending frequency corresponding to the application name.

The holding determination section 58B further determines whether or not the acquired sending frequency is the defined frequency pre-stored in a predetermined region of the memory 104, or greater. The holding determination section 58B notifies the relay section 56A of a determination result that there is no need to hold the electronic text data request if the acquired sending frequency is lower than the defined frequency. However, the holding determination section 58B notifies the relay section 56A of a determination result that it is necessary to hold the electronic text data request if the acquired sending frequency is the defined frequency or higher.

Processing transitions to step S90 when, based on the determination result from the holding determination section 58B, the relay section 56A determines that it is necessary to hold the electronic text data request, and the electronic text data request is held in a queue. Processing transitions to step S20 when, based on the determination result from the holding determination section 58B, the relay section 56A determines that there is no need to hold the electronic text data request, and the electronic text data request is sent to the data management server 20A.

Accordingly in the present exemplary embodiment, determination as to whether or not to hold an electronic text data request received during the token updating interval is made for each application based on the sending frequency of electronic text data requests by the application 60. Electronic text data requests from an application 60 with an electronic text data request sending frequency of the defined frequency or higher are held in a queue, and electronic text data requests from an application 60 with an electronic text data request sending frequency lower than the defined frequency are sent to the data management server 20A without being held.

This accordingly enables an increase in the communication load on the terminal 10B during the token updating interval to be suppressed, and also enables the user friendliness of the application 60 to be raised.

Note that the processing of the holding determination section 58B according to the third exemplary embodiment may be combined with the processing of the holding determination section 58 according to the second exemplary embodiment.

For example, first, determination may be made for each application as to whether or not to hold an electronic text data request received during the token updating interval, based on the sending frequency of electronic text data requests by the application 60. For electronic text data requests that it is not determined necessary to hold, the number of tickets attached to the electronic text data request is then determined, and if the number of attached tickets is the defined number of tickets or fewer, the electronic text data request may be then be subject to various processing, for example being sent to the data management server 20A. In such cases, the electronic text data request is held in a queue if the number of attached tickets exceeds the defined number of tickets, even when an electronic text data request that it is not determined to be necessary to hold based on the sending frequency.

In the third exemplary embodiment, the electronic text data request sending frequency of the application 60 is used to make determination as to whether or not to hold the electronic text data request, however other attributes relating to the application 60 may also be employed.

For example, the foremost application 60 displayed on the screen of the terminal 10B, not illustrated in the drawings (foreground application), may be considered to be in use by the user of the terminal 10B. An electronic text data request from the foreground application may accordingly be sent to the data management server 20A without holding in a queue even during the token updating interval.

Applications 60 other than the foreground application are simply running on the terminal 10B, and may be considered as applications 60 not being directly operated by the user of the terminal 10B. An electronic text data request from an application 60 other than the foreground application may accordingly be held in a queue if sent during a token updating interval.

Executing such processing enables a reduction in the communication load on the terminal 10B during the token updating interval, without reducing the user friendliness of the foreground application.

There is therefore a need for the holding determination section 58B to ascertain the foreground application. To this end, a foreground application acquisition function preexisting as a function of the OS, for example, may be used.

Alternatively, processing may be executed to reference a priority ranking of the applications 60, and electronic text data requests from applications 60 with a priority rank of a predetermined priority rank or higher may be sent to the data management server 20A without holding in a queue even during a token updating interval.

The data management server 20A may then determine whether or not the resource requested is accessible by each application 60 of the terminal 10B.

To this end, for example, an application ID uniquely indicating the application 60 that sent the electronic text data request may be attached to the header of the electronic text data request in the terminal 10B.

In such cases, the permission policy table illustrated in FIG. 31 may be used by the data management server 20A in place of the permission policy table illustrated in FIG. 11.

The permission policy table illustrated in FIG. 31 is the permission policy table illustrated in FIG. 11, with an additional column for the application ID. The permission policy table illustrated in FIG. 31 sets out which applications 60 are permitted to access which resource URLs, and the ticket statuses indicated by the ticket data from the terminal 10B required to access the resource URLs. The example illustrated in FIG. 31 states that the application 60 with the application ID "app#1" is able to access "http://foo.bar.com:8080/baz1" if the ticket data from the terminal 10B is (location, user rights, user status)=(at school, teacher, working).

Accordingly, access requests for "http://foo.bar.com:8080/baz1" from the application 60 with the application ID "app#2" would be denied even were the ticket data from the terminal 10B to be (location, user rights, user status)=(at school, teacher, working).

However, when the application ID of the application 60 is added as an access condition for a resource URL, the access determination section 23 is unable to determine whether or not a resource URL is accessible from the determination results table illustrated in FIG. 12 using the token alone.

In such cases, the determination results table illustrated in FIG. 32 is accordingly employed in place of the determination results table illustrated in FIG. 12. The determination results table illustrated in FIG. 32 is the determination results table illustrated in FIG. 12 with an additional column for the application ID.

The determination results table illustrated in FIG. 32 enables acquisition of determination results as to whether or not a resource URL is accessible using a combination of a token and an application ID, thereby enabling application in cases in which the application is added as an access condition to a resource URL.

Explanation has been given regarding the first exemplary embodiment to the third exemplary embodiment of technology disclosed herein, however the technology disclosed herein is not limited to the scope of the first exemplary embodiment to the third exemplary embodiment. Various modifications and enhancements may be applied to the first exemplary embodiment to the third exemplary embodiment within a range not departing from the spirit of the technology disclosed herein, and configurations applied with such modifications or enhancements are included within the technical scope of the technology disclosed herein. For example, processing sequences may be modified within a range not departing from the spirit of the technology disclosed herein.

Explanation has been given regarding configurations in which the terminal programs 120, 120A, and 120B, each of these being an example of a terminal program according to the technology disclosed herein, are pre-stored (installed) in the storage section 106, however there is no limitation thereto. The terminal program of the technology disclosed herein may be provided in a format stored on a computer readable storage medium. For example, the terminal program according to the technology disclosed herein may be provided in a format stored on a portable storage medium such as a CD-ROM, DVD-ROM, or USB memory, or on a semiconductor memory such as flash memory.

Similarly, there is no limitation to installing the access control programs 220, 220A, these being respective examples of the data management program according to the technology disclosed herein, on the storage section 206. The data management program according to the technology disclosed herein may also be provided in a format stored on a computer readable storage medium.

In such related access control processing, no consideration has been given to the load on the terminal or the communication traffic when the terminal sends data to the server. For example, in cases in which there is a need to send terminal data required in order to acquire a resource during resource acquisition from the server, when the terminal makes frequent attempts to acquire data, processing to attach terminal data to an electronic text requesting the resource is performed on each occasion, increasing the load on the terminal. If restrictions on the sending of data from the terminal to the server are imposed in order to suppress an increase in the load on the terminal in such cases, more time is needed to acquire resources from the server, leading to a reduction in the user-friendliness of the terminal, such as, for example, delays in screen display on the terminal.

An aspect of technology disclosed herein exhibits the advantageous effect of enabling the load on the terminal to be reduced without detriment to the user friendliness of the terminal, even when there is a frequent need to send terminal data required to acquire resources to a server.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal device, comprising:
a processor configured to execute a process, the process comprising:
receiving an electronic text data request requesting data managed by a data management server;
attaching, to the received electronic text data request, a token generated by the data management server, the token associated with at least one ticket used as an access right to the data and corresponding to a circumstance of the terminal, or a circumstance of a user using the terminal, or both;
from among the at least one ticket, further attaching, to the electronic text data request, a changed status ticket with a changed status corresponding to a change in the circumstance, the changed status ticket includes at least ticket type and ticket name indicating a specific content relating to the ticket type and in a case which the ticket name is changed, a status of the changed status ticket is changed; and
holding transmission of a new electronic text data request when the new electronic text data request is received during an interval between sending the electronic text data request, with the changed status ticket attached thereto, to the data management server and receiving an updated token based on the changed status ticket from the data management server, and relaying any held electronic text data requests to the data management server in sequence, after the interval when there are no changed status tickets of the terminal present.

2. The terminal device of claim 1, wherein:
on receipt of the new electronic text data request during the interval, determination is made for each of the new electronic text data requests as to whether or not it is necessary to hold relay to the data management server; and
transmission of the new electronic text data request is held when holding is determined to be necessary, and the new electronic text data request is relayed to the data management server without holding when holding is determined to be unnecessary.

3. The terminal device of claim 2, wherein an application that sent the new electronic text data request received during the interval is identified, and determination is made as to whether or not it is necessary to hold transmission of the new electronic text data request based on an attribute of the identified application.

4. The terminal device of claim 3, wherein:
the attribute of the application is a transmission frequency at which electronic text data requests are sent by the application; and
determination is made to hold the new electronic text data request when the new electronic text data request is received during the interval from an application for which the transmission frequency is a predetermined defined frequency or higher.

5. The terminal device of claim 2, wherein determination is made to hold the new electronic text data request in cases in which the new electronic text data request received during the interval has a number of changed status tickets of the terminal exceeding a predetermined number of tickets.

6. The terminal device of claim 2, wherein determination is made as to whether or not it is necessary to hold transmission of the new electronic text data request based on a type of data requested by the new electronic text data request received during the interval.

7. The terminal device of claim 1, wherein the electronic text data request is expressed in a format that conforms to HTTP.

8. A non-transitory recording medium storing a program that causes a computer to execute a terminal process, the process comprising:
receiving an electronic text data request requesting data managed by a data management server;
attaching, to the received electronic text data request, a token generated by the data management server, the token associated with at least one ticket used as an access right to the data and corresponding to a circumstance of the terminal, or a circumstance of a user using the terminal, or both;
from among the at least one ticket, further attaching, to the electronic text data request, a changed status ticket with a changed status corresponding to a change in the circumstance, the changed status ticket includes at least ticket type and ticket name indicating a specific content relating to the ticket type and in a case which the ticket name is changed, a status of the changed status ticket is changed; and
holding transmission of a new electronic text data request when the new electronic text data request is received during an interval between sending the electronic text data request, with the changed status ticket attached thereto, to the data management server and receiving an updated token based on the changed status ticket from the data management server, and relaying any held electronic text data requests to the data management server in sequence, after the interval when there are no changed status tickets of the terminal present.

9. The non-transitory recording medium of claim 8, wherein the terminal process further comprises:
on receipt of the new electronic text data request during the interval, determining for each of the new electronic text data requests whether or not it is necessary to hold relay to the data management server; and
holding transmission of the new electronic text data request when holding is determined to be necessary, and relaying the new electronic text data request to the data management server without holding when holding is determined to be unnecessary.

10. The non-transitory recording medium of claim 9, the terminal process further comprising identifying an application that sent the new electronic text data request received during the interval, and determining whether or not it is necessary to hold transmission of the new electronic text data request based on an attribute of the identified application.

11. The non-transitory recording medium of claim 10, wherein:
the attribute of the application is a transmission frequency at which electronic text data requests are sent by the application; and the terminal process further comprises determining to hold the new electronic text data request when the new electronic text data request is received during the interval from an application for which the sending frequency is a predetermined defined frequency or higher.

12. The non-transitory recording medium of claim 9, the terminal process further comprising determining to hold the new electronic text data request in cases in which the new electronic text data request received during the interval has a number of changed status tickets of the terminal exceeding a predetermined number of tickets.

13. The non-transitory recording medium of claim 9, the terminal process further comprising determining whether or not it is necessary to hold transmission of the new electronic text data request based on a type of data requested by the new electronic text data request received during the interval.

14. The non-transitory recording medium of claim 8, wherein the electronic text data request is expressed in a format that conforms to HTTP.

15. A data management system, comprising:
   a terminal device including:
      a processor configured to execute a process, the process comprising:
         receiving an electronic text data request requesting data managed by a data management server, and that relays the electronic text data request to the data management server;
         attaching, to the electronic text data request, a token generated by the data management server and associated with at least one ticket used as an access right to the data and corresponding to a circumstance of the terminal, or a circumstance of a user using the terminal, or both;
         from among the at least one ticket, further attaching, to the electronic text data request, a changed status ticket with a changed status corresponding to a change in the circumstance; and
         determining, when a new electronic text data request is received during an interval between sending the electronic text data request, with the changed status ticket attached thereto, to the data management server and receiving an updated token based on the changed status ticket from the data management server, for each new electronic text data request whether or not it is necessary to hold relay to the data management server; and
   a data management server including:
      a processor configured to execute a process, the process comprising:
         associating a token generated based on the at least one ticket with a ticket status of the terminal indicated by the at least one ticket managing the association;
         determining whether or not it is permissible to acquire data requested by an electronic text data request requesting a resource and having a token attached thereto; and
         relaying a response including the data to the terminal when it is determined that it is permissible for the data to be acquired, wherein:
   transmission of the new electronic text data request is held when it is determined that holding the new electronic text data request is necessary, and relaying the new electronic text data request to the data management server without holding when it is determined that holding is unnecessary;
   the token corresponding to the ticket status are updated when, from among the at least one ticket, the electronic text data request has attached thereto a changed status ticket with a changed status corresponding to a change in the circumstance, manages changes in ticket status of the terminal device in time sequence for each terminal device and for each ticket type, and associates an updated token with ticket data of the terminal device created by combining the most recent ticket status for each ticket type, and manages the association; and
   the updated token is relayed to the terminal device.

* * * * *